(12) United States Patent
Galyaev

(10) Patent No.: US 11,733,401 B1
(45) Date of Patent: Aug. 22, 2023

(54) SIGNAL DETECTOR ARRAY COMPRISING VERTICAL OFFSETS

(71) Applicant: Radiation Detection and Imaging Technologies, LLC, Tempe, AZ (US)

(72) Inventor: Evgeny Galyaev, Phoenix, AZ (US)

(73) Assignee: Radiation Detection and Imaging Technologies, LLC, Tempe, AZ (US)

( * ) Notice: Subject to any disclaimer, the term of this patent is extended or adjusted under 35 U.S.C. 154(b) by 8 days.

(21) Appl. No.: 17/585,385

(22) Filed: Jan. 26, 2022

Related U.S. Application Data

(60) Provisional application No. 63/142,420, filed on Jan. 27, 2021.

(51) Int. Cl.
*G01T 1/185* (2006.01)
(52) U.S. Cl.
CPC .................................... *G01T 1/185* (2013.01)
(58) Field of Classification Search
CPC ...................................................... G01T 1/185
See application file for complete search history.

(56) References Cited

U.S. PATENT DOCUMENTS

| | | | |
|---|---|---|---|
| 10,617,889 B1 * | 4/2020 | Galyaev | ............... A61N 5/1077 |
| 11,089,672 B1 * | 8/2021 | Galyaev | ............... H05K 1/0274 |
| 2017/0319872 A1 * | 11/2017 | Galyaev | .................. H01J 47/02 |
| 2020/0273664 A1 * | 8/2020 | Wang | .................... H01J 37/244 |

* cited by examiner

*Primary Examiner* — David P Porta
*Assistant Examiner* — Gisselle M Gutierrez
(74) *Attorney, Agent, or Firm* — Booth Udall Fuller, PLC

(57) ABSTRACT

A particle beam detector array with a cathode plane offset from an anode plane and a sensitive region between the cathode plane and the anode plane. The cathode plane and the anode plane are configured to create an electric field within the sensitive region. The anode plane has sensor pads configured to conduct electric current based on the fluence and position of an incident particle beam. A first plurality of conductive pins extends away from the sensor pads into the sensitive region. Each pin of the first plurality of pins is electrically coupled to one of the sensor pads. The sensor pads may be coupled to a series of strips with at least two layers, where each layer is associated with a different axis of at least two axes. A second plurality of pins may be electrically coupled to and extend away from the cathode plane into the sensitive region.

20 Claims, 23 Drawing Sheets

SIGNAL DETECTOR ARRAY COMPRISING VERTICAL OFFSETS

CROSS REFERENCE TO RELATED APPLICATIONS

This application claims the benefit of the filing date of U.S. Provisional Patent Application 63/142,420 entitled "SIGNAL DETECTOR ARRAY COMPRISING VERTICAL OFFSETS" to Galyaev that was filed on Jan. 27, 2021, the disclosure of which is hereby incorporated herein by this reference.

TECHNICAL FIELD

Aspects of this document relate generally to particle beam detector arrays, and more specifically to particle beam detector arrays with elongated pins.

BACKGROUND

Parallel-plate segmented ionization chambers are often used for high-resolution image reconstruction or in planar air ionization detectors, such as those used in clinical cancer radiotherapy. With the ionization chamber, a cathode plane and an anode plane are offset from each other to create a volume between them, called the sensitive region. The cathode plane and the anode plane are configured to create an electric field within the sensitive region by applying differing electric potentials, which helps with detection of electrons that have been separated from an ionized particle by an incident particle or beam of particles. However, as the electrons travel through the sensitive region, some electrons recombine with particles of the gas, limiting the strength and accuracy of the detected signal. Thus, there is a need for decreasing the occurrence of recombination within the ionization chamber.

SUMMARY

Aspects of this document relate to a particle beam detector array, comprising a cathode plane offset from an anode plane and a sensitive region extending between the cathode plane and the anode plane with the sensitive region filled with a gas, wherein the cathode plane and the anode plane are configured to create an electric field within the sensitive region, the anode plane comprising conductive sensor pads arranged in a repeating pattern and configured to conduct electric current based on a fluence and a position of an incident particle beam, wherein the sensor pads are coupled to a series of conductive strips with at least two layers, wherein the conductive strips within each layer are aligned with a different axis of at least two planar axes X and Y, and wherein the sensor pads form a plurality of interlocking detection clusters with each detection cluster coupled to the at least two planar axes X and Y, a first plurality of conductive elongated pins extending away from the sensor pads into the sensitive region, wherein each pin of the plurality of pins is electrically coupled to one of the conductive sensor pads, and a second plurality of conductive elongated pins electrically coupled to and extending away from the cathode plane into the sensitive region.

Particular embodiments may comprise one or more of the following features. A length of each pin of the first plurality of elongated pins may be greater than half of a distance between the cathode plane and the anode plane and a length of each pin of the second plurality of elongated pins may be greater than half of a distance between the cathode plane and the anode plane. The planar axis X may be perpendicular to the planar axis Y. Each pin of the first plurality of elongated pins may protrude less than or equal to 5 millimeters into the sensitive region. Each sensor pad may have a longest dimension of less than or equal to 5 millimeters.

Aspects of this document relate to a particle beam detector array, comprising a cathode plane offset from an anode plane and a sensitive region extending between the cathode plane and the anode plane with the sensitive region filled with a gas, wherein the cathode plane and the anode plane are configured to create an electric field within the sensitive region, the anode plane comprising conductive sensor pads arranged in a repeating pattern and configured to conduct electric current based on a fluence and a position of an incident particle beam, wherein the sensor pads are coupled to a series of conductive strips with at least two layers, and wherein the conductive strips within each layer are aligned with a different axis of at least two planar axes X and Y, and a first plurality of conductive pins extending away from the sensor pads into the sensitive region, wherein each pin of the plurality of pins is electrically coupled to one of the conductive sensor pads.

Particular embodiments may comprise one or more of the following features. A length of each pin of the first plurality of pins may be greater than half of a distance between the cathode plane and the anode plane. The planar axis X may be perpendicular to the planar axis Y. Each pin of the first plurality of pins may protrude less than or equal to 5 millimeters into the sensitive region and each sensor pad may have a longest dimension of less than or equal to 5 millimeters. A distance between the cathode plane and the anode plane may be less than or equal to 10 millimeters.

Aspects of this document relate to a particle beam detector array, comprising a cathode offset from an anode and a sensitive region extending between the cathode and the anode, wherein the cathode and the anode are configured to create an electric field within the sensitive region, the anode comprising conductive sensor pads arranged in a repeating pattern and configured to conduct electric current based on a fluence and a position of an incident particle beam, and a first plurality of conductive pins extending away from the sensor pads into the sensitive region, wherein each pin of the plurality of pins is electrically coupled to one of the conductive sensor pads.

Particular embodiments may comprise one or more of the following features. The particle beam detector array may further comprise a second plurality of conductive pins electrically coupled to and extending away from the cathode into the sensitive region. The first plurality of pins may overlap with the second plurality of pins in a direction parallel with the first plurality of pins. A length of each pin of the first plurality of pins may be greater than half of a distance between the cathode and the anode. Each pin of the first plurality of pins may protrude less than or equal to 5 millimeters into the sensitive region and each sensor pad may have a longest dimension of less than or equal to 5 millimeters. A distance between the cathode and the anode may be less than or equal to 10 millimeters. The sensor pads may be coupled to a series of conductive strips with at least two layers and the conductive strips within each layer may be aligned with a different axis of at least two axes X and Y. The sensor pads may form a plurality of interlocking detection clusters with each detection cluster coupled to the at least two axes X and Y. The series of conductive strips may have three layers and the at least two axes X and Y may be three axes X, Y, and ST (stereo). Each interlocking detection cluster of the plurality of interlocking detection clusters may comprise a diamond shape X sensor pad, a diamond shape Y sensor pad, and a diamond shape ST sensor pad joined to form the interlocking detection cluster comprising a hexagonal shape.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U. S. C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
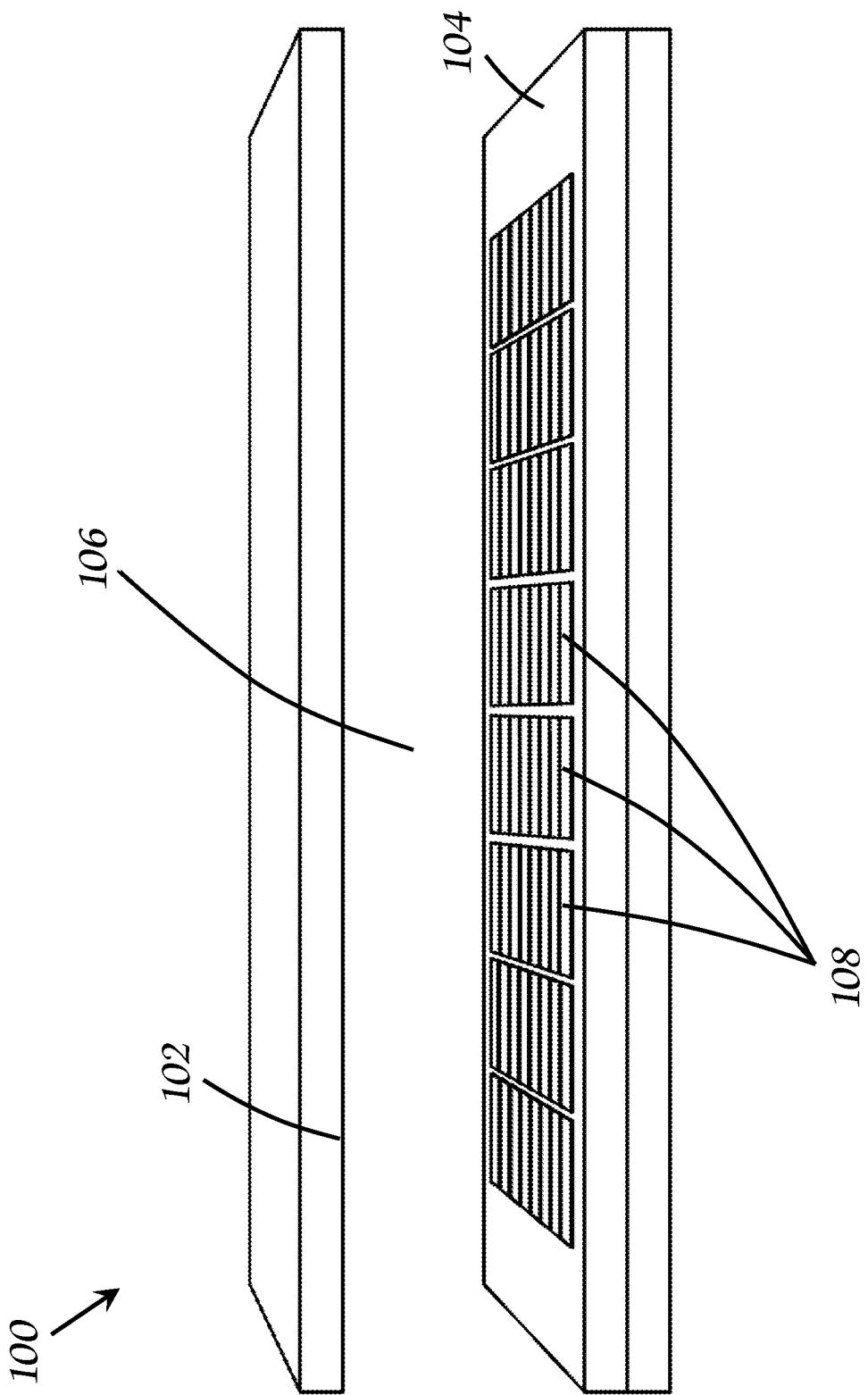
FIG. 1 is a perspective schematic view of a particle beam detector array with conductive sensor pads.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 2:
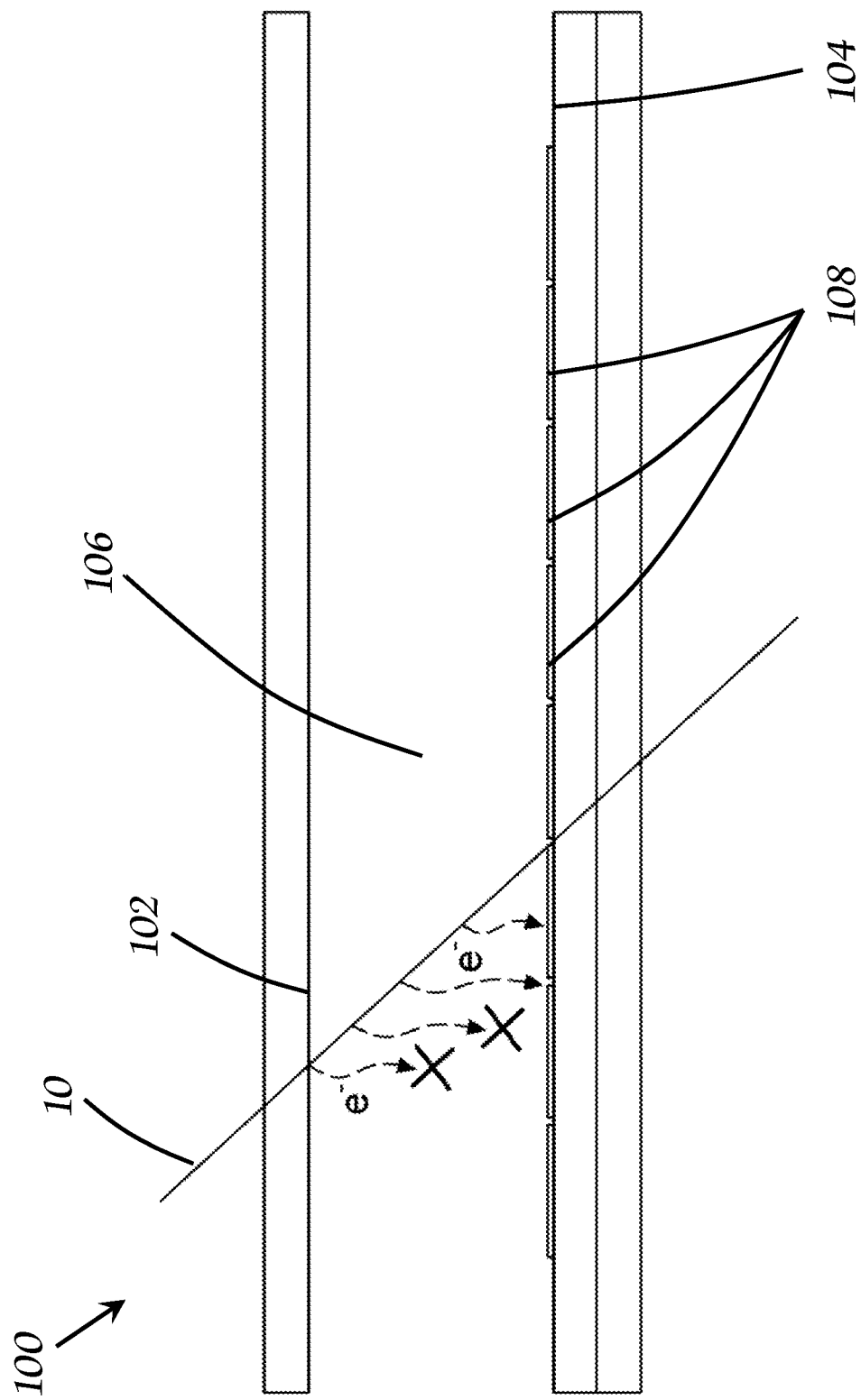
FIG. 2 is a side view of the particle beam detector array shown in FIG. 1 showing an incident particle beam causing ionization, where some particles recombine.

The present disclosure is related to a particle beam detector array 100 that comprises a cathode 102, an anode 104, and a sensitive region 106 extending between the cathode 102 and the anode 104. The particle beam detector array 100 is configured to improve ionization charge collection within an ionization chamber without increasing the potential difference between the cathode 102 and the anode 104. By improving the ability of the system to collect drift electrons, the system is able to detect particle beams with more accuracy and precision. As shown in FIGS. 1 and 2, both the cathode 102 and the anode 104 may be planar, and thus the cathode 102 may be a cathode plane and the anode 104 may be an anode plane. The cathode 102 and the anode 104 may be separated by a distance of less than or equal to 10 millimeters. Other dimensions may also be implemented depending on the unique configuration of the particle beam detector array 100. The cathode 102 and the anode 104 are configured to create an electric field within the sensitive region 106. The electric field may be created by applying an electric potential difference between the cathode 102 and the anode 104.

As shown in FIG. 2, when the incident particle or particle beam 10 enters the sensitive region 106, it ionizes particles, creating electron-ion pairs. When no electric field is applied, the electron-ion pairs often simply recombine. With an electric field applied, the electrons are accelerated toward the anode 104. This acceleration helps to avoid recombination for a period of time, thus creating a measurable signal on the anode 104 as the electrons reach and are collected by the anode 104. The measured signal may be linearly proportional to the strength or fluence of the incident particle beam 10.

The anode 104 may comprise conductive sensor pads 108. The sensor pads 108 may be configured to individually collect electrons, thus allowing the detector array 100 to measure the strength and position of the incident particle beam 10. As used herein, a "particle beam" may refer to both a beam of multiple ionizing particles and to an individual ionizing particle. Thus, the particle beam detector array 100 is configured to measure the strength and position of a single incident ionizing particle 10 and/or an incident particle beam 10 comprising multiple particles. The sensor pads 108 may be configured in any way known in the art. For example, the sensor pads 108 may each be electrically isolated so that incident particle beams 10 that are collected on any given sensor pad 108 are measured separately from the remaining sensor pads 108. While this provides information regarding the location and intensity of the incident particle beam 10, a large number of channels is needed because each pad must have a separate channel. Thus, it may be preferable to "gang" the pads together along different dimensions.

Figure 3:
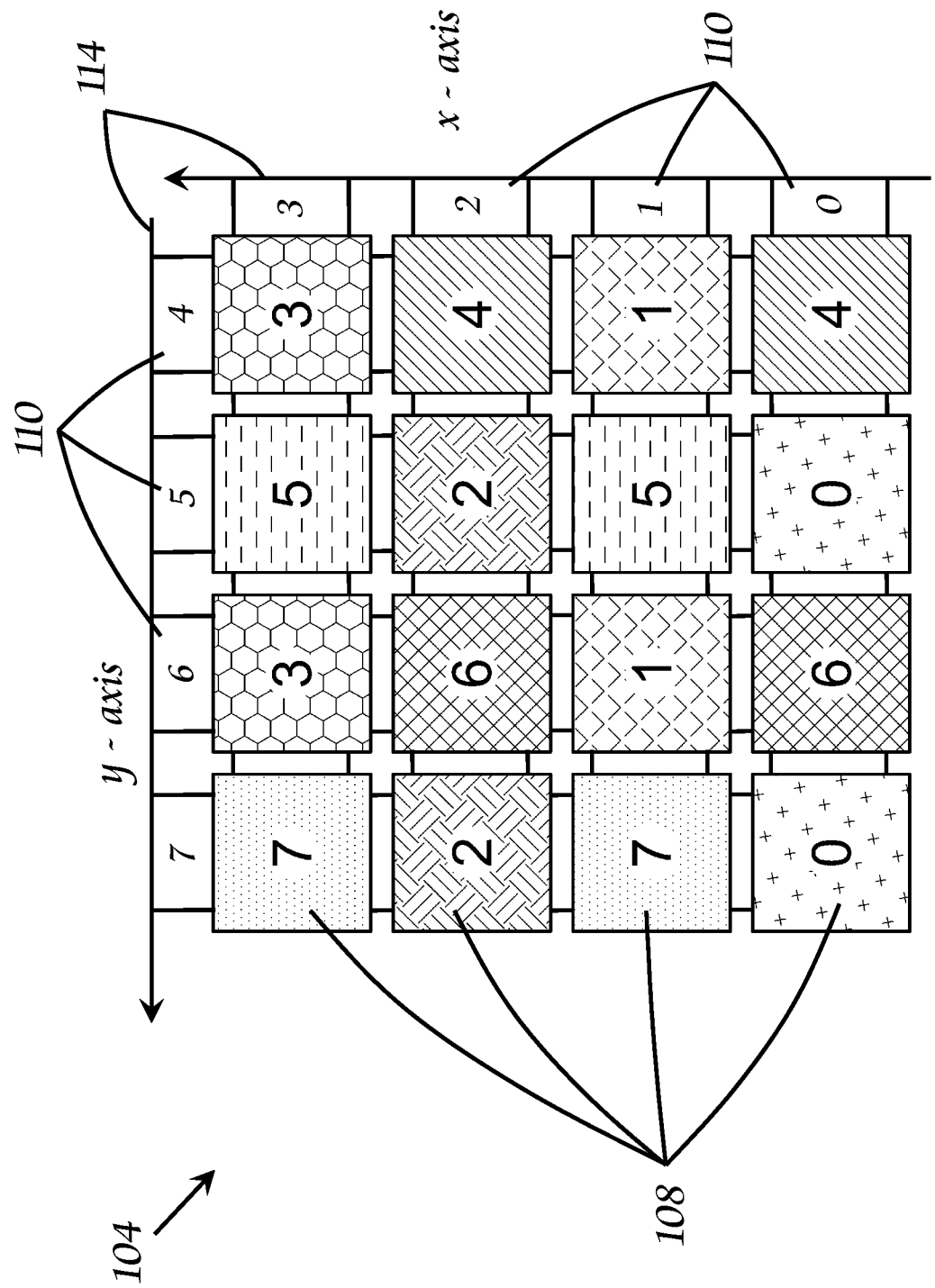
FIG. 3 is a schematic illustrating a configuration of sensor pads with two axes perpendicular to each other.
Figure 4:
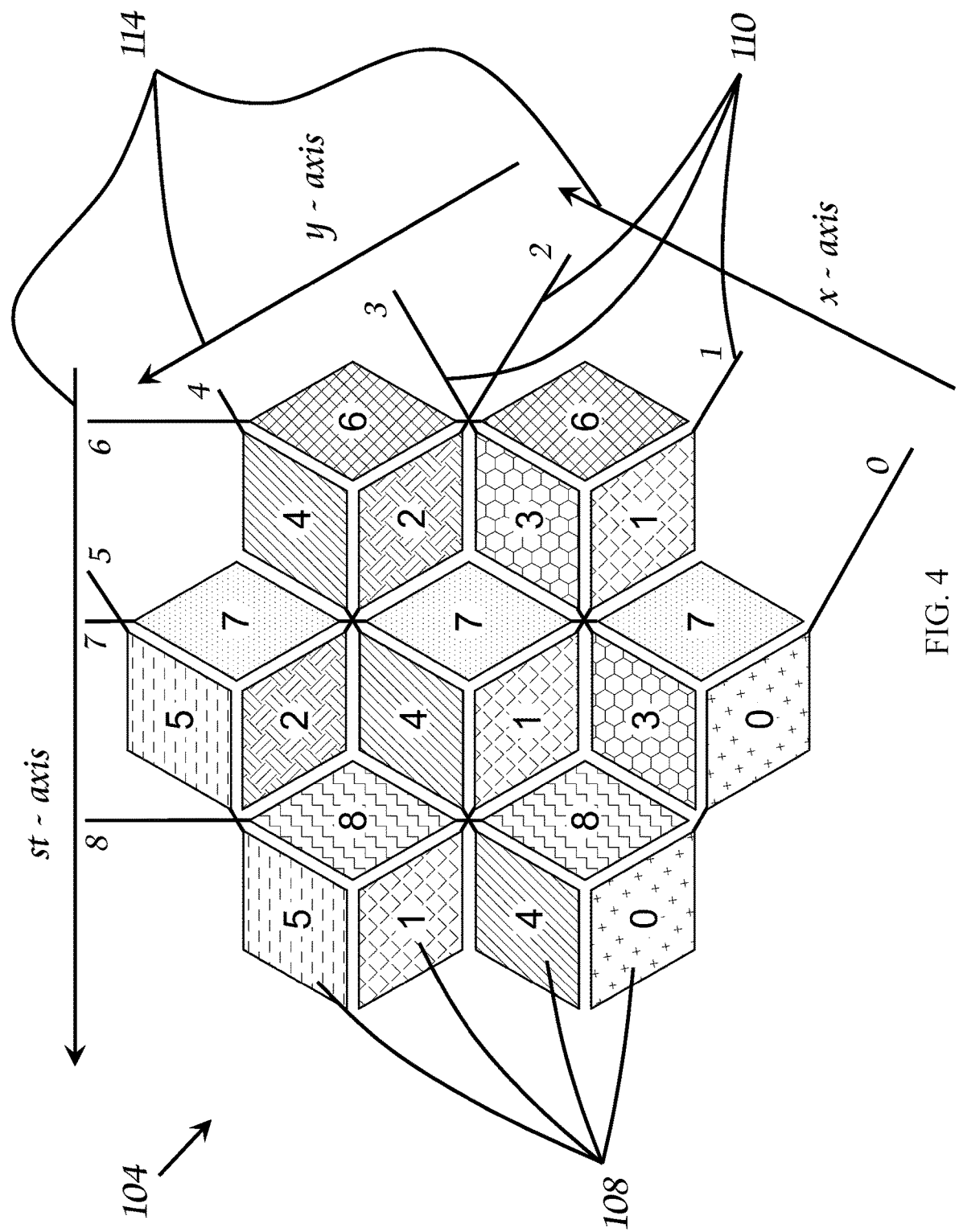
FIG. 4 is a schematic illustrating a configuration of sensor pads with three axes.
Figure 6:
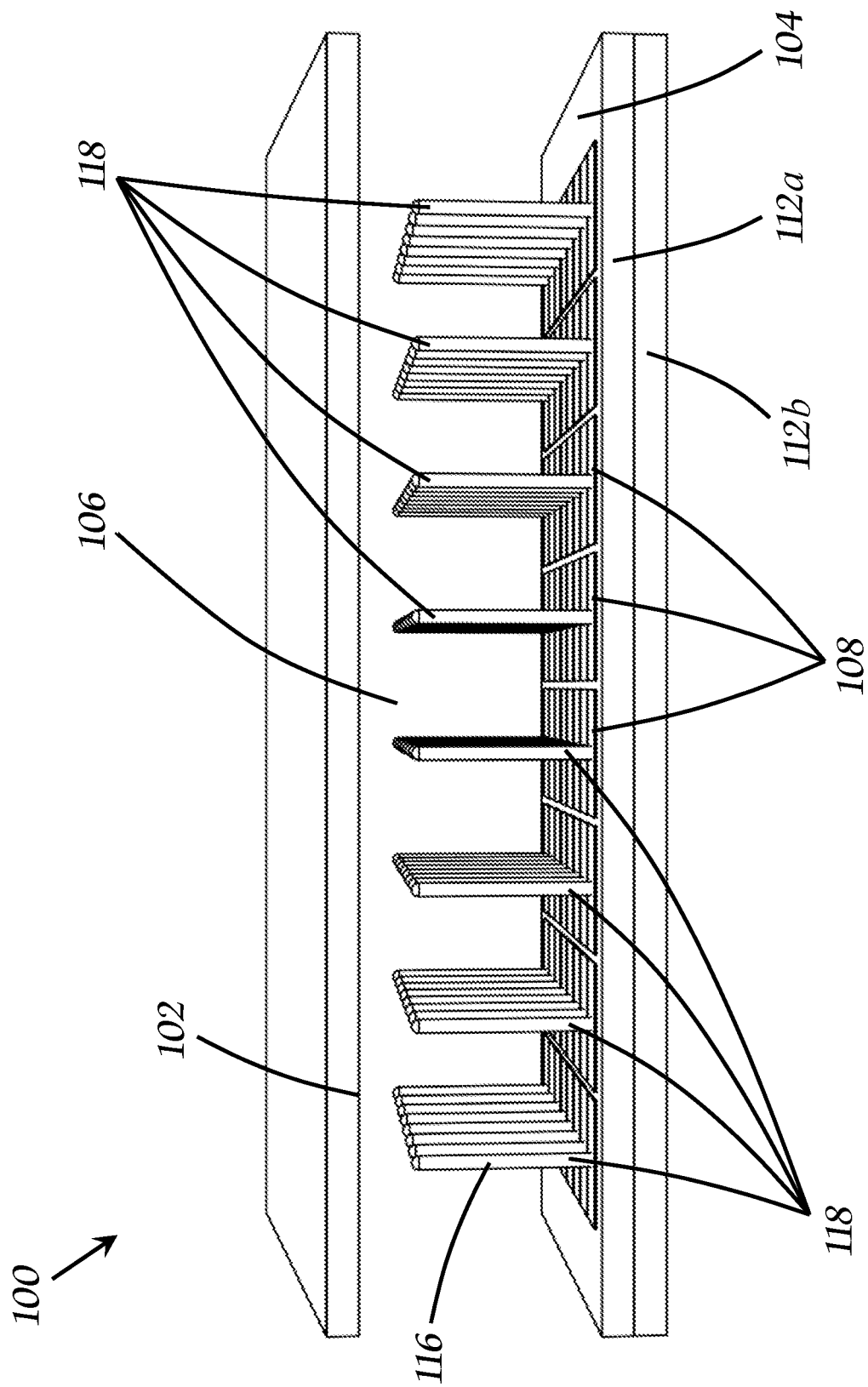
FIG. 6 is a perspective view of a particle beam detector array with conductive elongated pins extending away from the anode.
Figure 7:
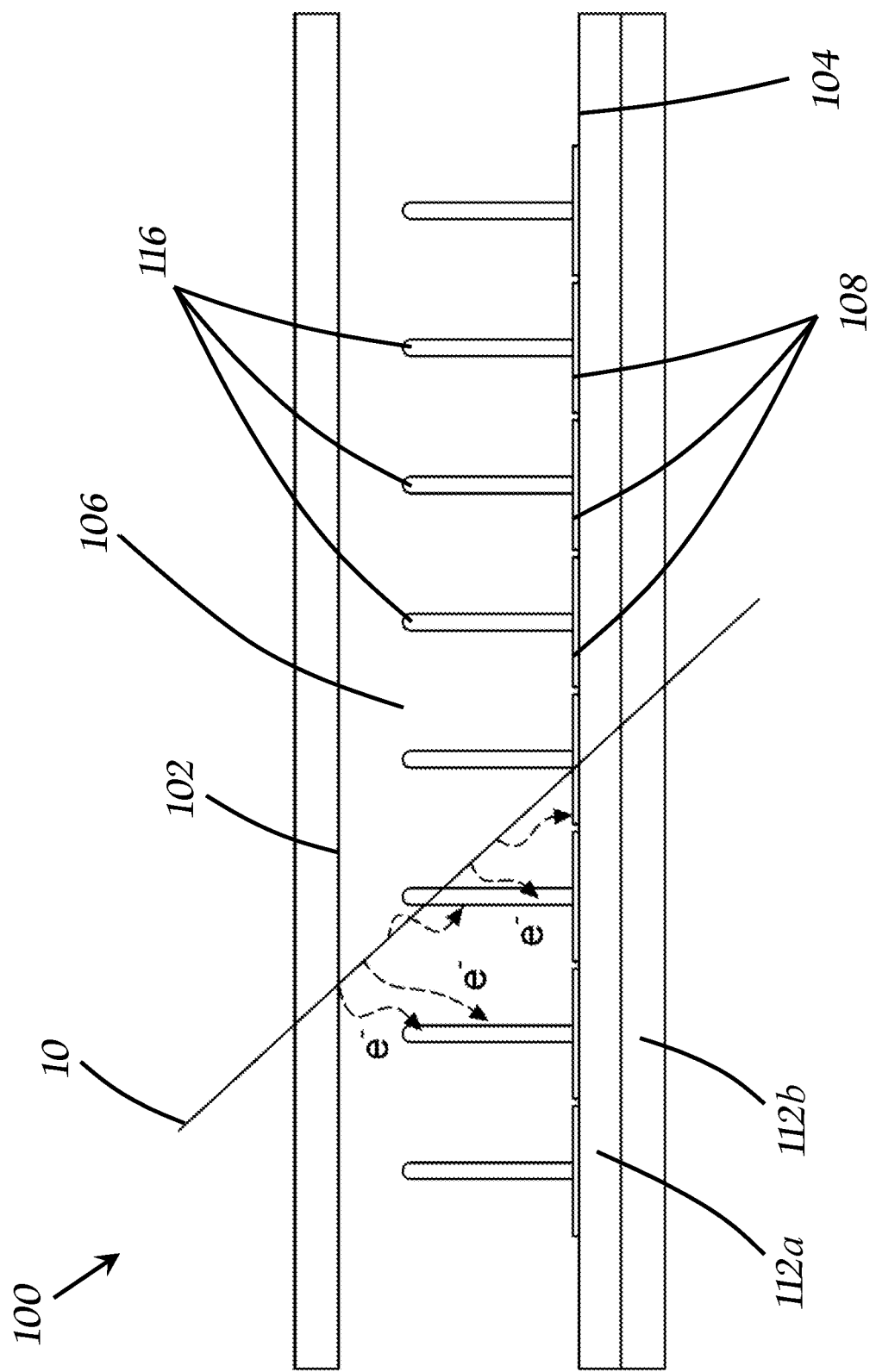
FIG. 7 is a side view of the particle beam detector array shown in FIG. 6 showing an incident particle beam causing ionization, where less particles recombine because of the pins.
Figure 9:
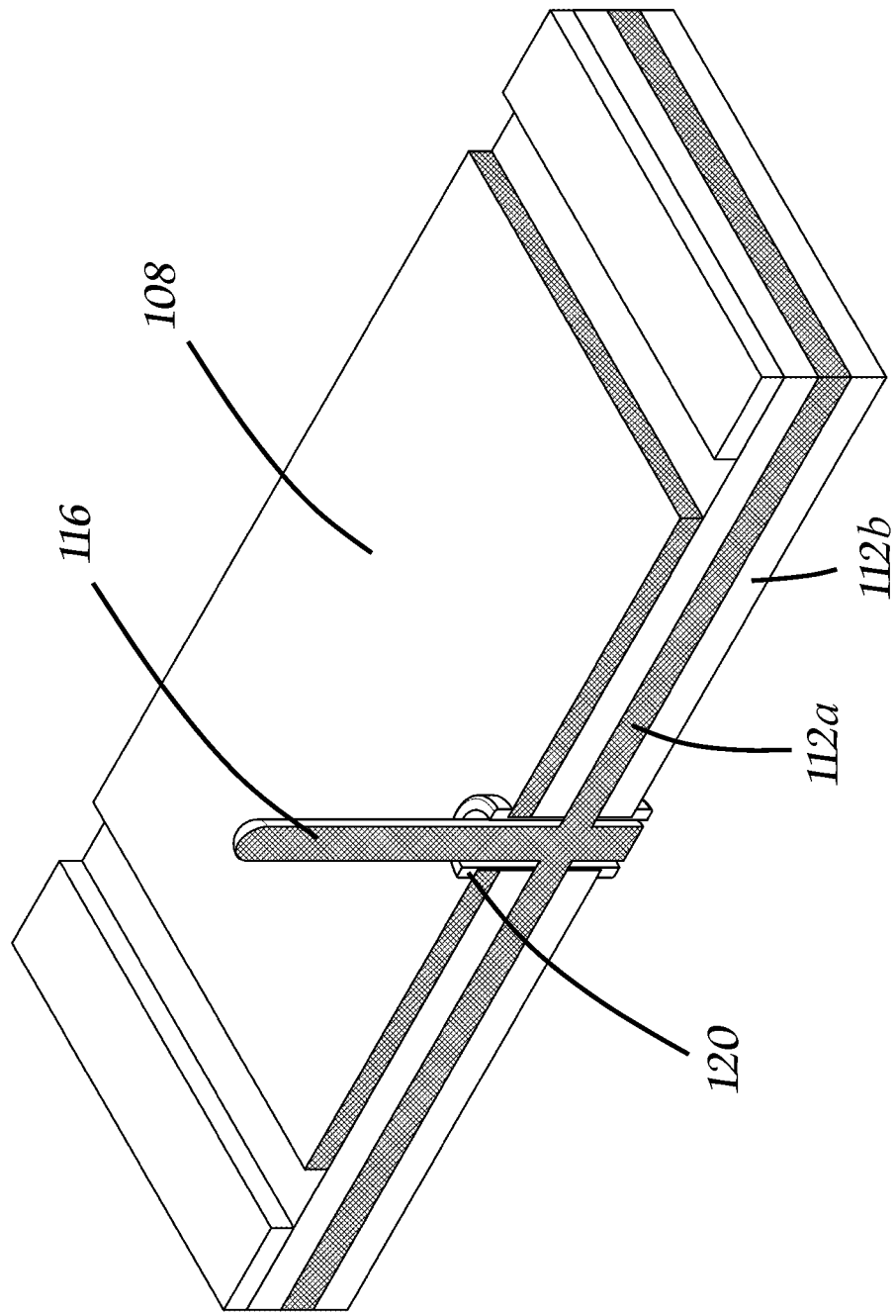
FIG. 9 is a cross section view of one of the sensor pads and pin shown in FIG. 8, showing a configuration to electrically couple the sensor pads to the conductive strips.

The sensor pads 108 may be arranged in a grid or other repeating pattern, as shown in FIGS. 3 and 4. The repeating pattern may have a plurality of axes 114. In some embodiments, the plurality of axes 114 is at least two planar axes X and Y. In particular embodiments, the planar axis X is perpendicular to the planar axis Y. The sensor pads 108 may be coupled to a series of conductive strips 110 that correspond with each axis 114 of the grid or repeating pattern. For example, as shown in FIG. 3, each strip 110 that corresponds to a particular axis 114 may extend perpendicular to that axis 114. Thus, along a particular axis 114, there are multiple strips 110. When the sensor pads 108 coupled to a particular strip 110 collect electrons, electric current is conducted to the strip 110 in a measurable signal. The position of the incident particle beam 10 determines which sensor pads 108 collect the electrons, which determines which strips 110 conduct electric current. In this way, the position of the incident particle beam 10 can be determined based on which strip 110 experiences an electric current. The strips 110 may be separated into layers 112, such as a first layer 112a and a second layer 112b, based on their corresponding axis 114, as shown in FIGS. 6, 7, and 9. For example, looking specifically at and comparing FIGS. 3 and 9, the strips 110 corresponding with the X-axis may be in the first layer 112a while the strips 110 corresponding with the Y-axis may be in the second layer 112b. This may help to electrically isolate each of the strips 110. An example of parallel-plate segmented ionization chambers with multi-dimensional readout strips can be found in U.S. Pat. No. 10,265,545, entitled "Ionizing Particle Beam Fluence and Position Detector Array Using Micromegas Technology with Multi-Coordinate Readout" to Galyaev, the disclosure of which is hereby incorporated herein by this reference.

As shown in FIG. 3 and explained above, when the sensor pads 108 are arranged in a grid, each row and each column can be tied together. This decreases the number of necessary channels to be the sum of the number of rows and the number of columns. In particular embodiments, the longest dimension of each sensor pad 108 may be less than or equal to 5 millimeters. Other dimensions may also be implemented depending on the unique configuration of the particle beam detector array 100. FIG. 4 is similar to FIG. 3, but three dimensions are used, all within the same plane. In the embodiment shown, nine channels are required, the series of conductive strips 110 has three layers 112, and the at least two axes 114 is three axes X, Y, and ST (stereo). The sensor pads 108 may be formed into a plurality of interlocking detection clusters, with each detection cluster having at least one pad 108 coupled to each of the axes 114. This helps to increase the precision of the detector array 100 while still limiting the number of necessary channels. When arranged as shown in FIG. 4, the plurality of interlocking detection clusters comprises a diamond shape sensor pad 108 associated with the X-axis, a diamond shape sensor pad 108 associated with the Y-axis, and a diamond shape sensor pad 108 associated with the ST-axis. These three sensor pads 108 join together to form the interlocking detection cluster, which, in this embodiment, is a hexagonal shape.

The sensitive region 106 may be filled with a gas. Typical gases used within the sensitive region 106 can vary to include air or any suitable gas or gases depending on the application, and will include gases with desirable attributes, such as being non-toxic, low flow, easy to maintain, and providing good electron amplification gain. In some instances, a Methane-Argon mixture called P10 (10% Methane) can be used. P10 is non-toxic, low flow, easy to maintain, and provides good electron amplification gain. Other gases, such as argon, neon, or helium. In some applications, air is selected for simplicity because it is freely available and easy to maintain. The selection of gas to be used within the particle beam detector array 100 is significant for various reasons. One of these reasons is that the gas used affects the behavior of the electrons within the sensitive region 106. As electrons travel through the sensitive region 106 over a larger distance and a greater amount of time, recombination of the electrons with an ion becomes more and more likely. Generally, free electrons only exists for a short time when in a gas such as air, and can only travel for a few millimeters. In some gases, such as hydrogen, however, electrons will recombine only very rarely and will travel very long distances, such as on the order of meters. Recombination is important because when electrons recombine with particles, they no longer reach the anode 104, and thus are not measured. This weakens the signal coming in through the anode 104 and decreases the precision and accuracy of the reading.

Figure 5:
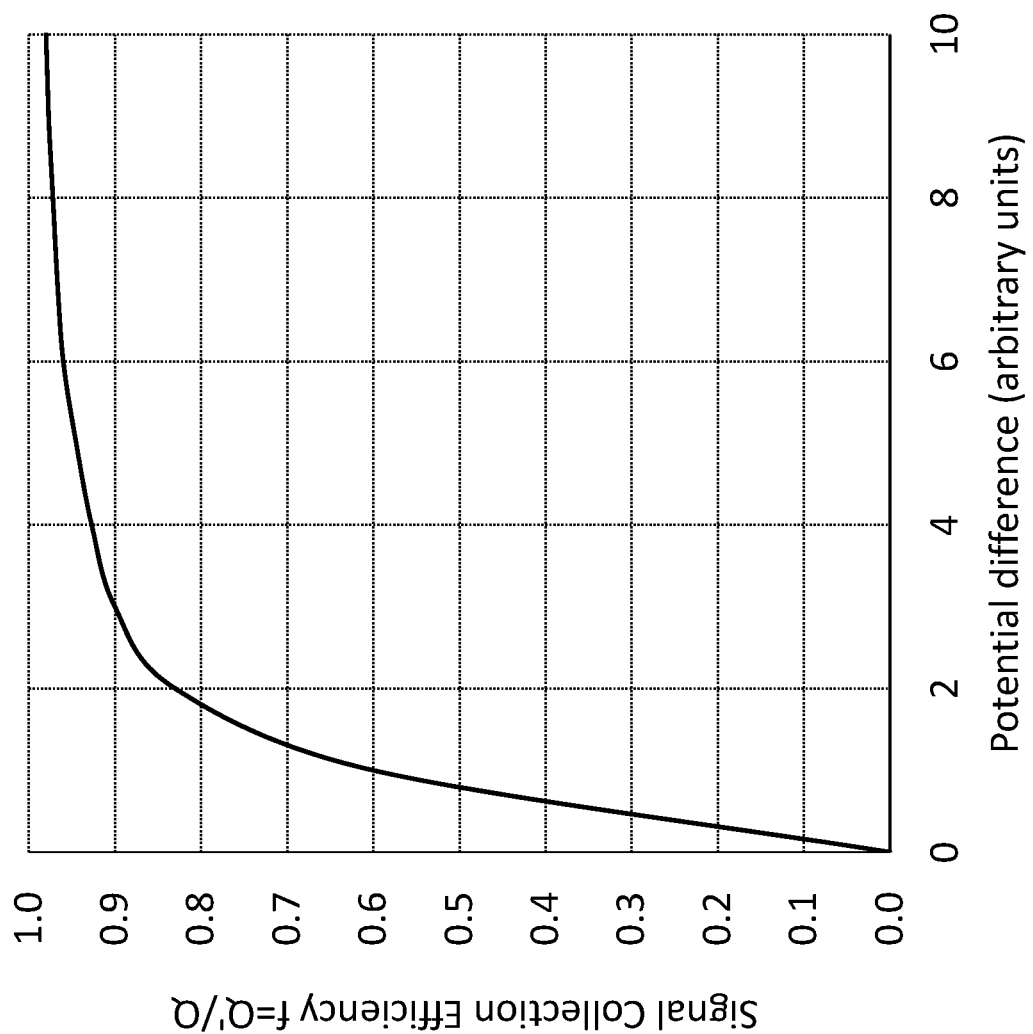
FIG. 5 is a graph illustrating the relationship between signal collection efficiency and potential difference between the anode and cathode.

The distance traveled and time spent ionized is also dependent on the energy of the electrons, which is gained by accelerating through the applied electric field. Thus, because the strength of the electric field is equal to the electric potential difference between the anode 104 and the cathode 102 divided by the distance between the anode 104 and the cathode 102, one solution to recombination is to apply a larger potential difference between the cathode 102 and the anode 104 for a stronger electric field. This makes the electrons travel farther and thus makes collection of the electrons more efficient. However, the potential difference cannot be increased indefinitely to eliminate recombination altogether. A relevant principle is that of saturation within the particle beam detector array 100. The particle beam detector array 100 is saturated when ionic recombination is absent. FIG. 5 illustrates the relationship between the signal collection efficiency (Q'/Q) and the potential difference. As shown, increasing the potential difference applied to the detector array 100 generally reduces recombination and asymptotically approaches saturation. However, as the potential difference reaches higher levels, two events may occur: the insulators of the system may experience electrical breakdown, or gas multiplication may occur. During gas multiplication, the free electrons gain enough kinetic energy from the electrical field to join the next atom they encounter in the gas. For this reason, in practice, the charge Q' that is collected by the anode 104 and measured by the electrometer is less than Q, the actual charge produced in the gas. Thus, increasing the electric field is not a perfect solution to the problem of recombination. Additionally, the industry standards in some consumer applications require that the potential difference used be as low as reasonable while still achieving the goal of the system. Some regulations even limit the actual potential difference than can be used. Thus, there is a need for a way to approach saturation without increasing the applied potential difference of the chamber.

Compounding the recombination problem explained above is the fact that a larger distance between the plane of the cathode 102 and the plane of the anode 104 is desirable. By increasing the distance between the cathode plane 102 and the anode plane 104, an incident particle or beam 10 will encounter more gas, thus producing a larger ionization signal and making the signal easier to detect. However, a larger distance increases recombination and reduces the strength of the electric field at the same potential difference.

Figure 8:
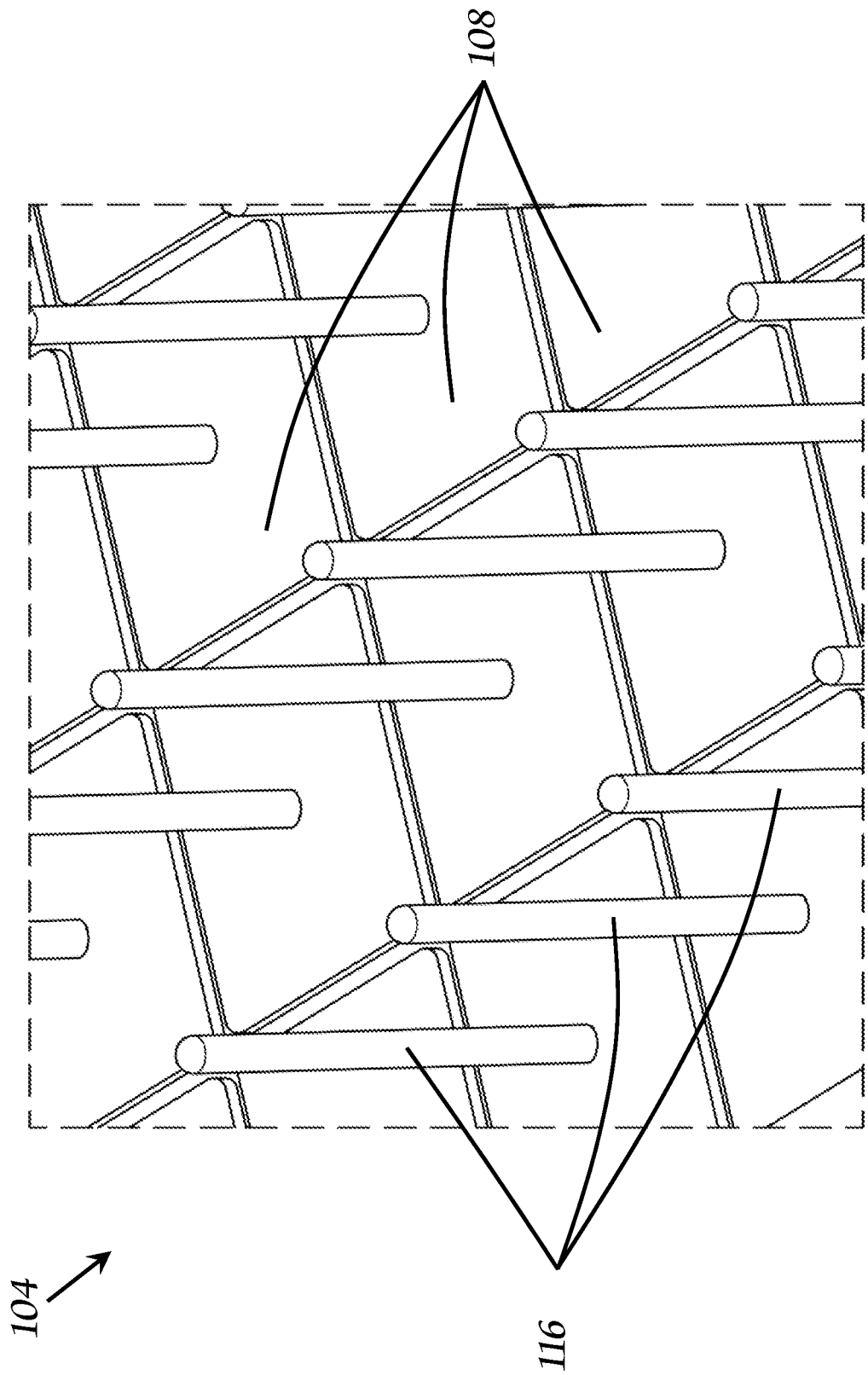
FIG. 8 is a close-up perspective view of the anode of the particle beam detector array shown in FIG. 6.

To allow for a larger distance between the cathode plane 102 and the anode plane 104 while still limiting the potential difference and occurrence of recombination and maintaining or increasing the strength of the electric field, the anode plane 104 and/or the cathode plane 102 may be protruded into the sensitive region 106. As shown in FIGS. 4-6, this may be done with a plurality of conductive protrusions 116. The conductive protrusions 116 may be formed as wires, bumps, or pins, and may be elongated. The conductive protrusions or pins 116 may also have ends in the shape of spherical bumps or drops, or some other suitable form that caps or closes the pins 116 to improve collection efficiency. A first plurality of pins 118 extends away from the sensor pads 108 on the anode plane 104 into the sensitive region 106. As shown in FIG. 8, each pin 116 of the first plurality of pins 118 is electrically coupled to one of the sensor pads 108. This carries the electric potential of the sensor pads 108 and the anode plane 104 further out into the sensitive region 106, thus increasing the strength of the electric field through much of the sensitive region 106 while still leaving space for the incident particle beam 10 to ionize more electrons. In the embodiment shown, each sensor pad 108 only has one pin 116. However, in other embodiments, some or all sensor pads 108 may have more than one pin 116, and some sensor pads 108 may not have any pins 116. Each of the pins 116 may have the same length, thus keeping the electric field strength profile equal for each sensor pad 108 and pin 116 combination and increasing the uniformity of signal collection across the array 100. Alternatively, the length of each pin 116 may vary. A length of the pins 116 may be greater than half of the distance between the cathode 102 and the anode 104. In particular embodiments, especially embodiments where the gas used is air, each pin 116 of the first plurality of pins 118 may protrude less than or equal to 5 millimeters into the sensitive region 108. Other dimensions may also be implemented for the pins 116 depending on the unique configuration of the particle beam detector array 100.

The particle beam detector array 100 with pins 116 as explained above can have essentially the same volume of gas as a detector array 100 without pins 116, as shown in FIGS. 6 and 7 compared with FIGS. 1 and 2. Because the pins 116 are conductive and electrically coupled to the sensor pads 108, they are capable of collecting electrons in the same way as the sensor pads 108. This decreases the distance the electrons have to travel to be collected, and thus limits the occurrence of recombination, as shown by a comparison of the particle beam 10 shown in FIG. 7 with the particle beam 10 shown in FIG. 2. In addition, the strength of the electric field is higher because the distance over which the electric potential is applied is smaller. Thus, recombination is limited, and the potential difference can be smaller without having to move the cathode 102 and the anode 104 closer together. Essentially, having the pins 116 extend into the sensitive region 108 allows the detector array 100 to get into the saturation region at a lower potential difference.

Figure 10:
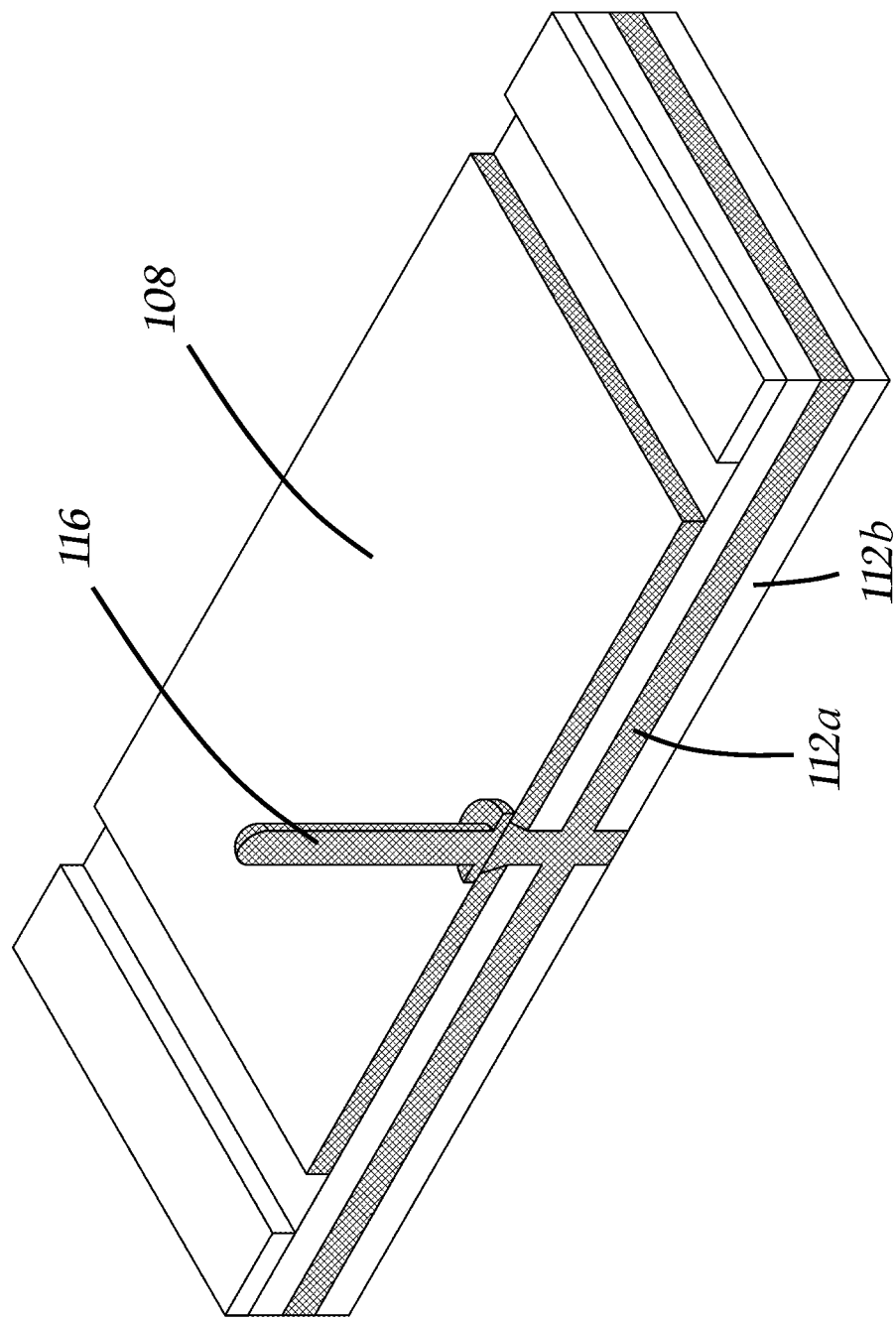
FIG. 10 is a cross section view of one of the sensor pads and pin shown in FIG. 8, showing another configuration to electrically couple the sensor pads to the conductive strips.

The pins 116 may be coupled with the sensor pads 108 in any way known in the art. FIG. 9 illustrates that a via 120, or hole, may extend through the layers 112 and the sensor pad 108. The pin 116 may extend through the via 120, electrically coupling with the sensor pad 108 and the layer 112 that corresponds with the sensor pad 108. The grayed-out materials shown in FIG. 9 show each of the components that are electrically coupled together. In some embodiments, the via 120 itself may elongated so that the via 120 rises above the sensor pad 108 and acts as a pin 116. In some embodiments, such as the embodiment shown in FIG. 10, the pin 116 may couple to the surface of the sensor pad 108 without extending into the sensor pad 108. In such an embodiment, the sensor pad 108 is separately coupled to the appropriate layer 112, as shown. Any other method of coupling the pin 116, the sensor pad 108, and the appropriate layer 112 together may also be implemented.

Figure 11:
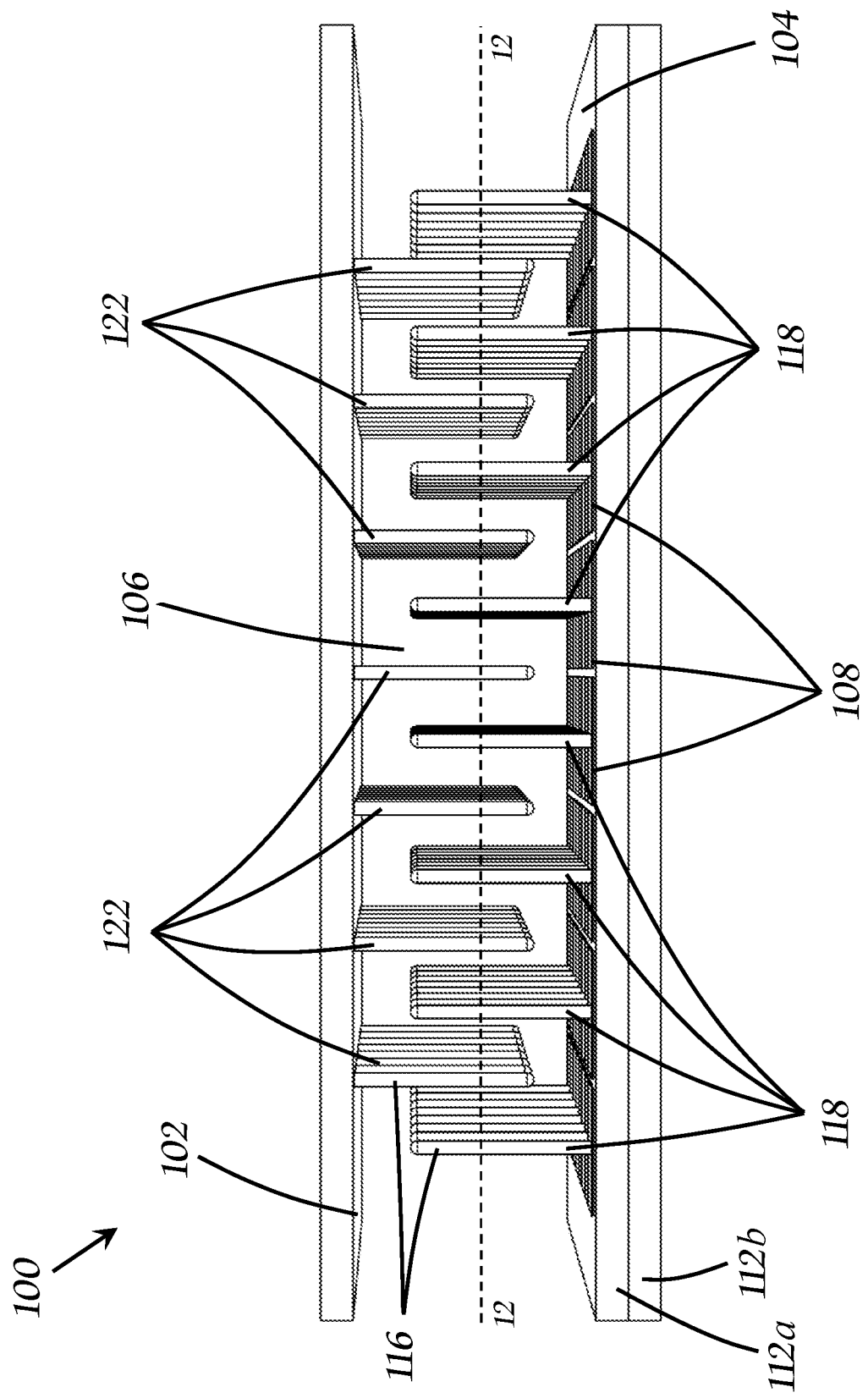
FIG. 11 is a perspective view of a particle beam detector array with conductive elongated pins extending away from the anode and from the cathode.
Figure 12:
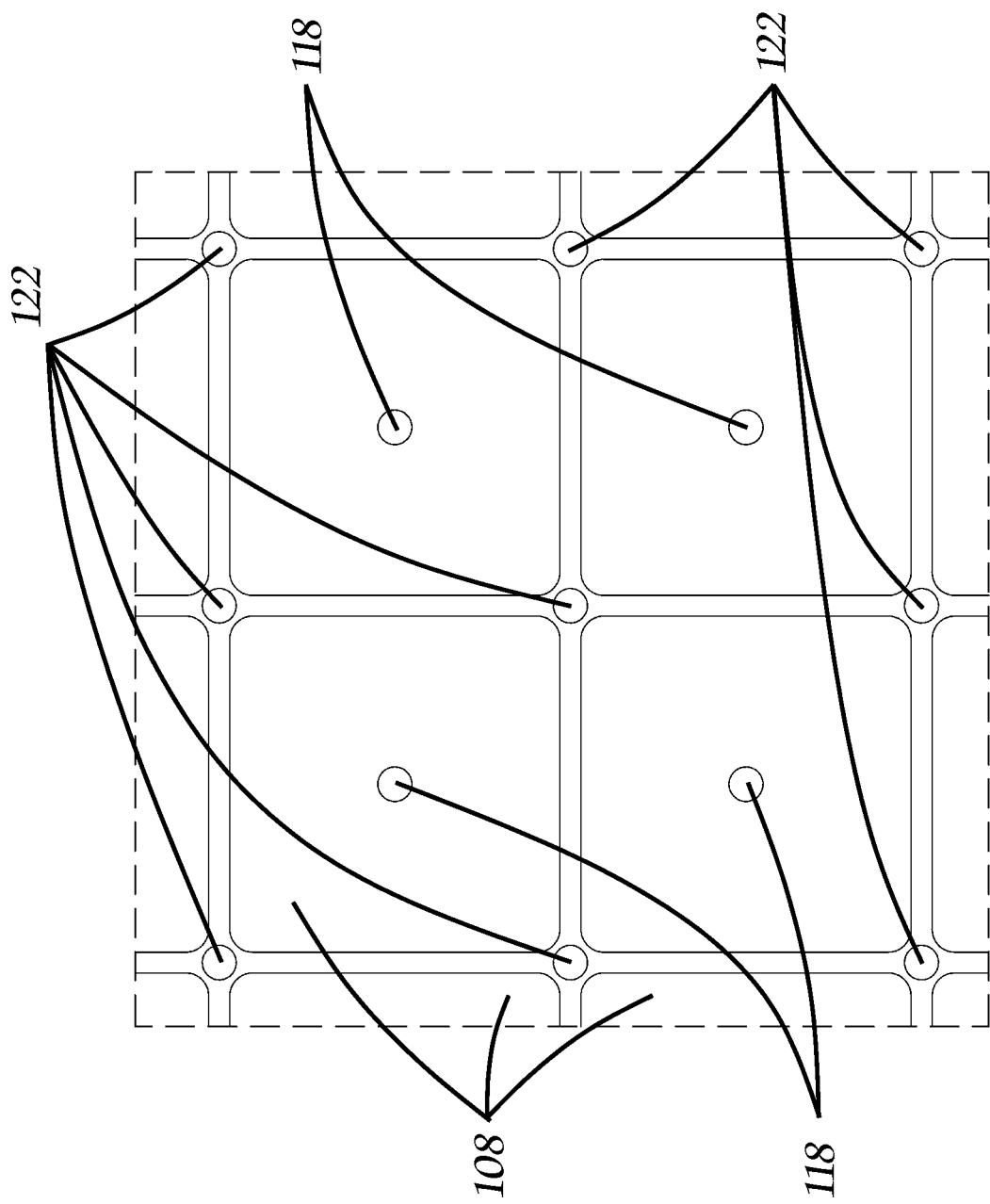
FIG. 12 is a close-up view of a cross section along a horizontal plane of the particle beam detector array shown in FIG. 11 taken along line 12-12.

The particle beam detector array 100 may also comprise a second plurality of pins 122 similar to the first plurality of pins 118, but electrically coupled to and extending away from the cathode plane 102 into the sensitive region 106, as shown in FIG. 11. This may further increase the electric field strength through the sensitive region 106, further reduce the distance that electrons travel before collection, and thus increase the efficiency of electron collection. This is especially true for detector arrays 100 filled with air because electrons travel even less distance in air before recombination. Thus, the same gas volume is more effectively used by extracting a more useful signal from the same volume. In such an embodiment, the length of the pins 116 that are part of the second plurality of pins 122 may be greater than half of the distance between the cathode 102 and the anode 104. The first plurality of pins 118 may overlap with the second plurality of pins 122 in a direction parallel with the first plurality of pins 118. In other words, the length of one of the first plurality of pins 118 plus the length of one of the second plurality of pins 122 may be greater than the distance between the anode 104 and the cathode 102. As shown in FIG. 12, the pins 116 may be arranged to be equidistant from each other. FIG. 12 illustrates an embodiment with two axes 114, where the X-axis and the Y-axis are perpendicular to each other. In this embodiment, each pin 116 of the first plurality of pins 118 is positioned in a center of each sensor pad 108, while each pin 116 of the second plurality of pins 122 is offset in the direction of both the X-axis and the Y-axis so that each pin 116 of the second plurality of pins 122 is positioned equidistant from four of the pins 116 of the first plurality of pins 118. Other alternating interlocking volumetric patterns may also be implemented.

Figures 13A, 13B:
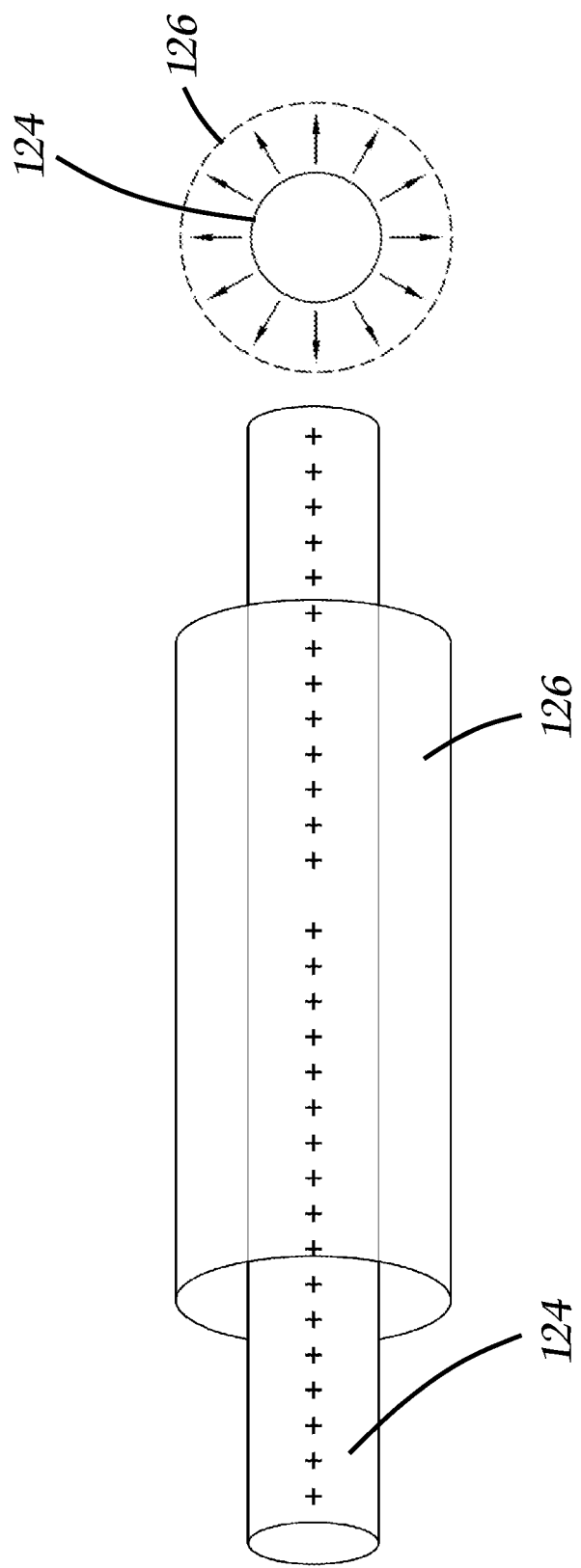
FIGS. 13A, 13B, and 14 are diagrams illustrating the theoretical reasoning for the effectiveness of the elongated pins.
Figure 14:
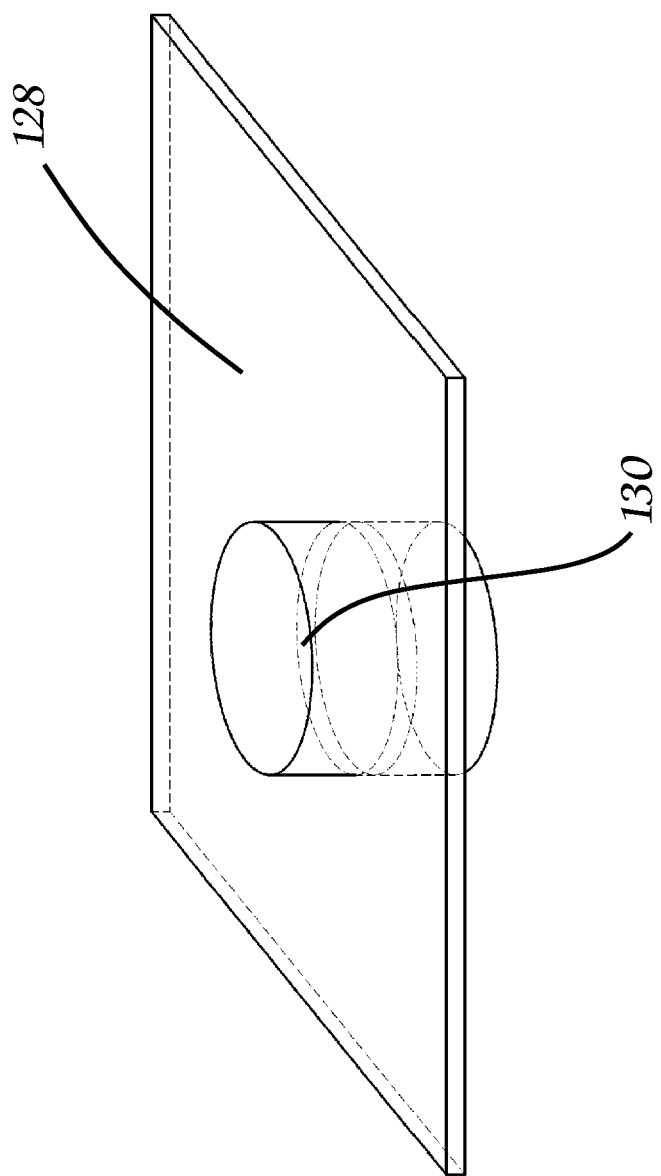

The electric field that is applied to the sensitive region 106 is stronger for the same potential difference between the cathode 102 and the anode 104 due to the shorter distances between the electric potential of the cathode 102 and the electric potential of the anode 104, and due to the fact that, with the pins 116 being modeled as long thin cylindrical conductors, the electric field at a given point within the sensitive region 106 is stronger than is the case of two parallel plates. This reasoning is supported by FIGS. 13A, 13B, and 14, which provide algebraic, or symbolic, support for the above assertions. For example, FIGS. 13A and 13B illustrate a portion of an infinite cylindrical conductor 124 wrapped with a cylindrical Gaussian surface 126. As is known in the art, the electric field surrounding the cylindrical conductor 124 is equal to the charge per unit length ($\lambda$) divided by the product of $2\pi$, the radius of the cylinder, and the permittivity of free space ($\varepsilon_0$), as shown below. FIG. 14 illustrates a planar surface 128 with a Gaussian surface 130 above the planar surface 128. The electric field above the planar surface 128 is equal to the charge density per square meter ($\sigma$) divided by the product of 2 and the permittivity of free space ($\varepsilon_0$), as shown below.

Electric field around a cylindrical conductor:

$$E = \frac{\lambda}{2\pi\varepsilon_0 r}$$

Electric field above a planar surface:

$$E = \frac{\sigma}{2\varepsilon_0}$$

A person of ordinary skill in the art will appreciate that the charge density is higher on small structures, such as the cylindrical structure shown in FIGS. 13A and 13B, than on even planes at the same voltage, as shown in FIG. 14. Stated another way, higher charge density results in the increased electric field strength in the vicinity of the pins 116, as compared to conventional planar structures. A number of benefits arise from using the detector array 100 comprising pins 116, including collecting more charge out of the same gas volume with the same potential difference applied between the cathode 102 and the anode 104, and getting into the saturation zone of the detector array 100 at a lower potential difference. A saturation zone at a lower potential difference may be advantageous in some consumer applications where lower bias voltages are desirable, where regulations suggest or require lower voltages, or where voltages are otherwise limited.

Figure 15:
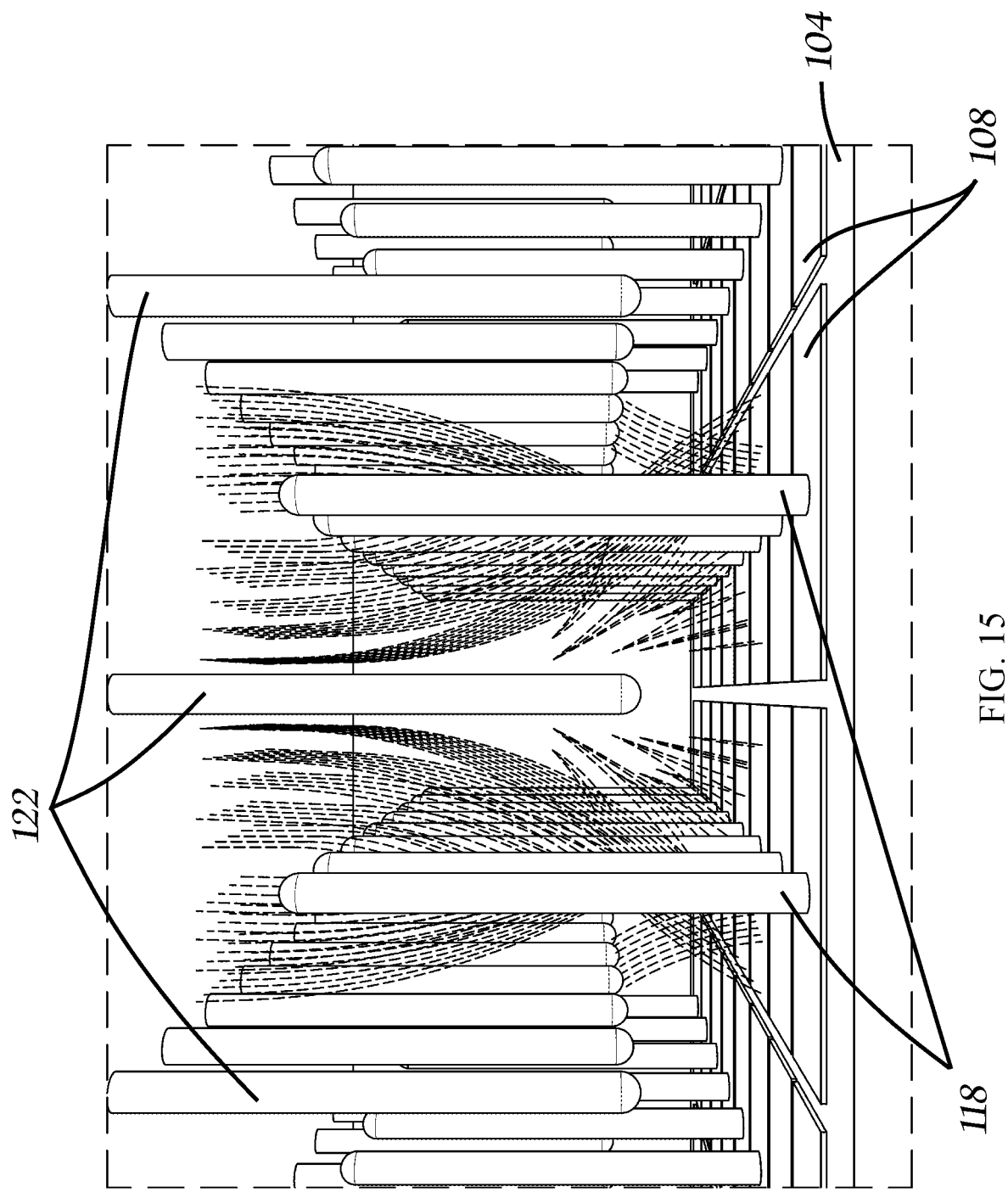
FIG. 15 is a close-up view of the particle beam detector array shown in FIG. 11 with electric field lines shown.
Figure 16:
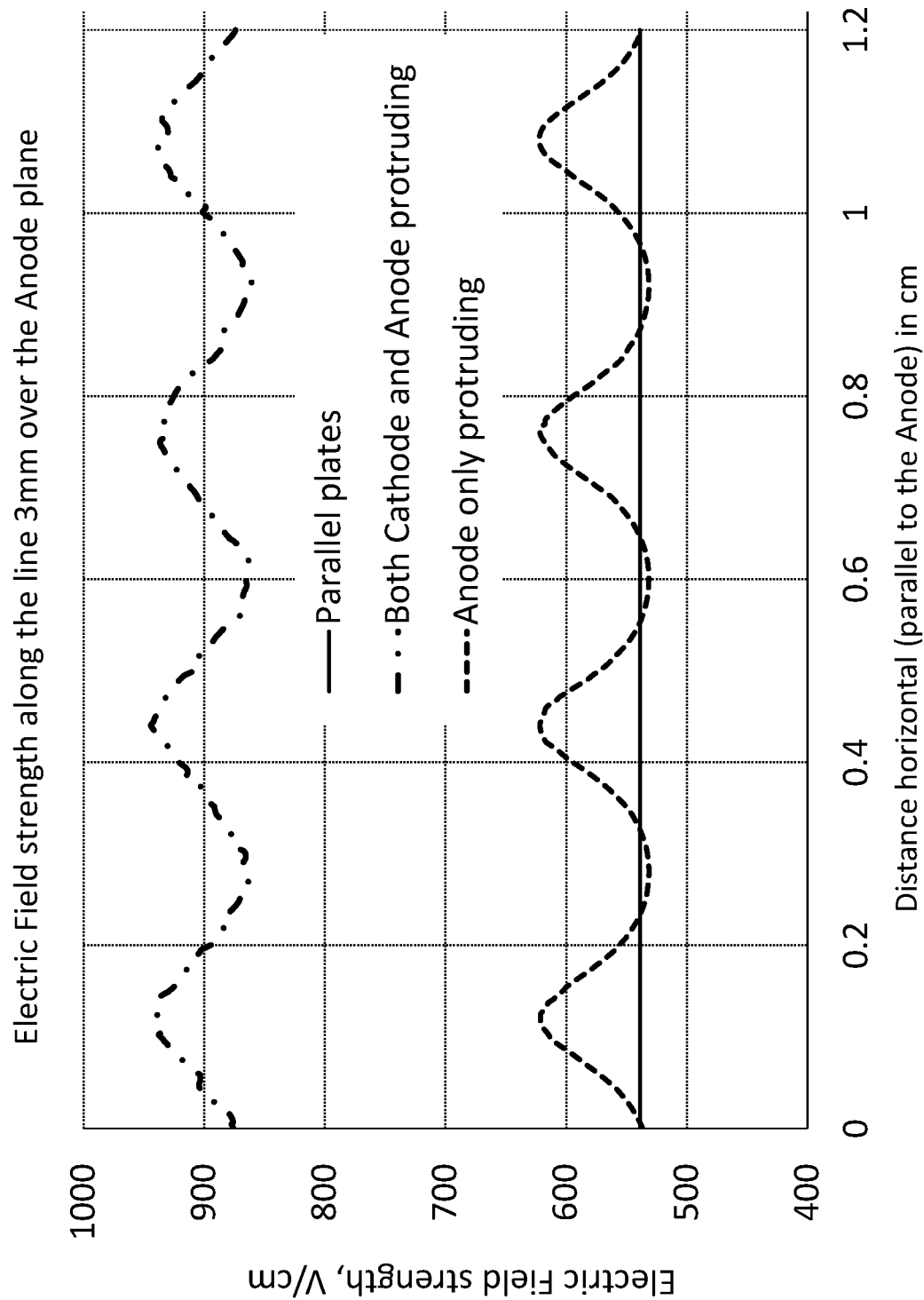
FIG. 16 is a graph showing the electric field strength along a horizontal line between the anode and the cathode.
Figure 17:
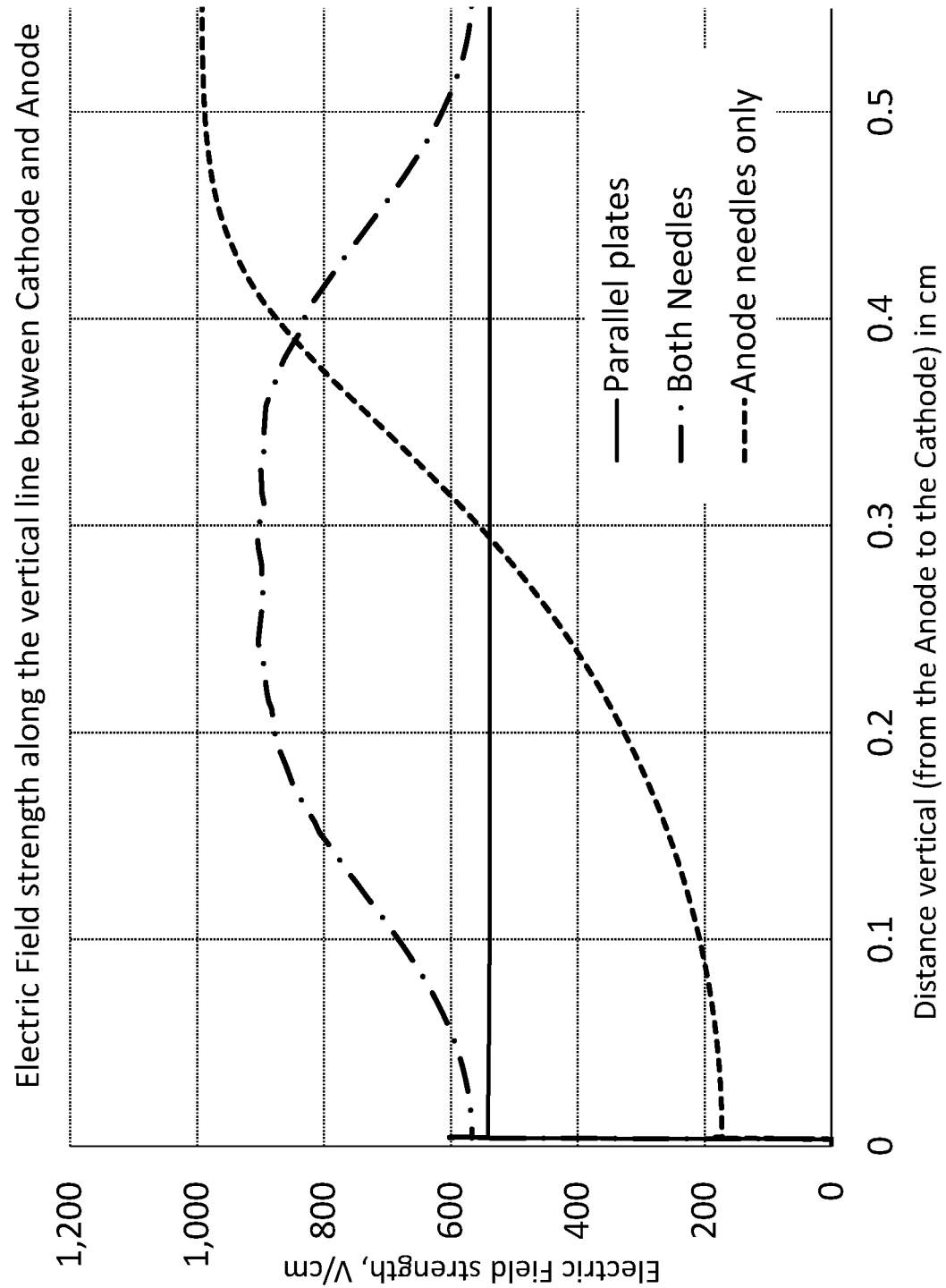
FIG. 17 is a graph showing the electric field strength along a vertical line moving from the anode to the cathode.

FIGS. 15-17 further illustrate the increased strength of the electric field when pins 116 are included in the particle beam detector array 100. FIG. 16 demonstrates that, while the electric field is constant along a horizontal line parallel to the anode 104 and the cathode 102 when no pins 116 are present, the electric field experiences spikes in strength in the vicinity of the pins 116 when the first plurality of pins 118 is included. Further, the strength of the electric field is much higher across the particle beam detector array 100 when both the first plurality of pins 118 and the second plurality of pins 122 are included. FIG. 17 demonstrates that, as might be expected, the electric field is constant along a vertical line perpendicular to the anode 104 and the cathode 102 when no pins 116 are present, while adding the first plurality of pins 118 decreases the strength of the electric field closest to the anode 104 but increases the strength of the electric field closest to the cathode 102 above the strength of the electric field at the same position when no pins 116 are present.

Adding both the first plurality of pins 118 and the second plurality of pins 122 leads to a more consistently strong electric field along the vertical line between the anode 104 and the cathode 102 and maintains a higher average electric field than any of the other options. As explained above, a higher electric field strength increases the effectiveness of the detector array 100 by increasing the energy of the electrons and decreasing the occurrence of recombination. The pins 116 allow the electric field strength to be increased without increasing the potential difference or decreasing the volume of the particle beam detector array 100.

Figure 18:
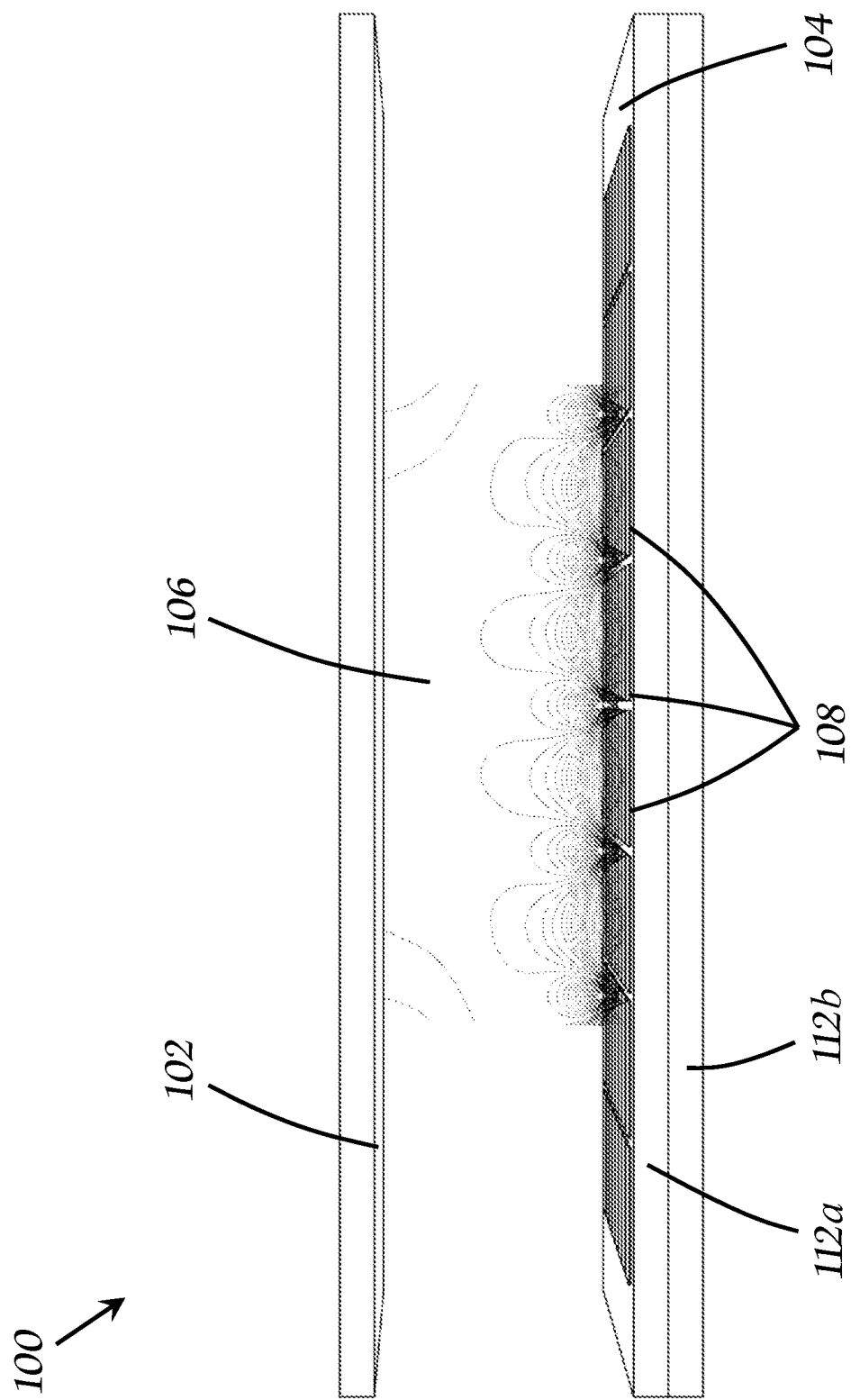
FIG. 18 is a perspective view of the particle beam detector array shown in FIG. 1 with electric field lines shown.
Figure 19:
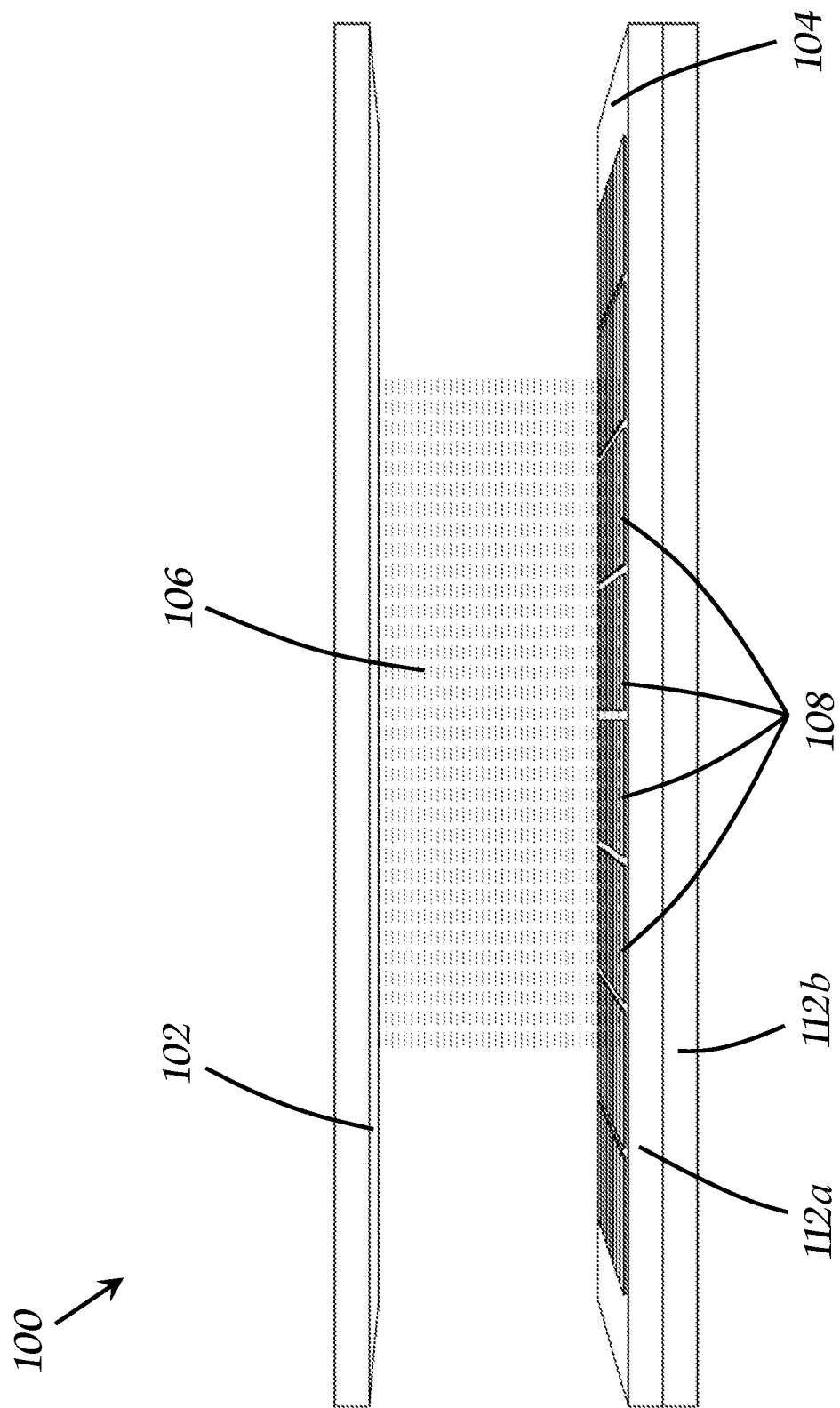
FIG. 19 is a perspective view of the particle beam detector array shown in FIG. 1 with voltage differential shown.
Figure 20:
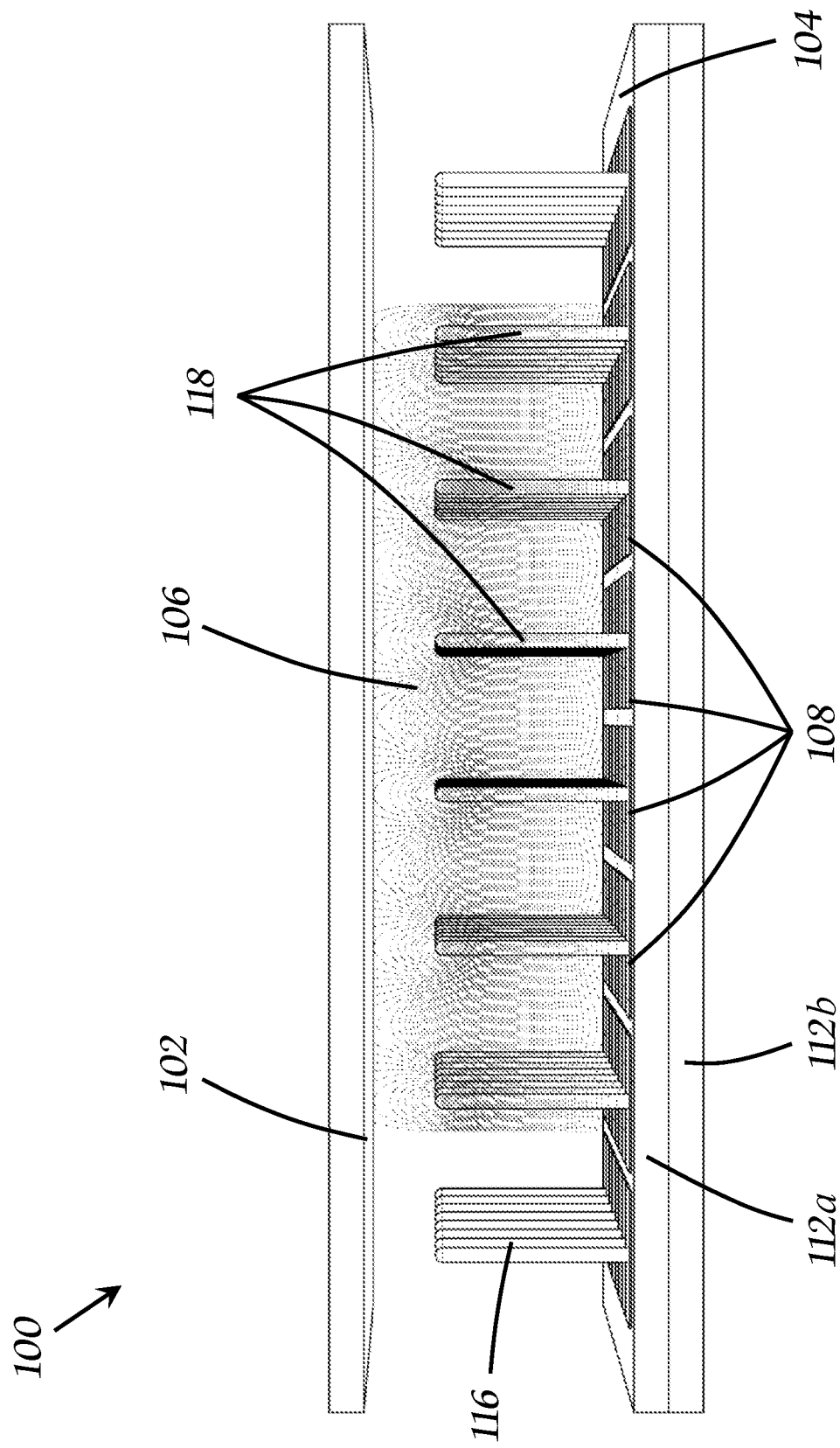
FIG. 20 is a perspective view of the particle beam detector array shown in FIG. 4 with electric field lines shown.
Figure 21:
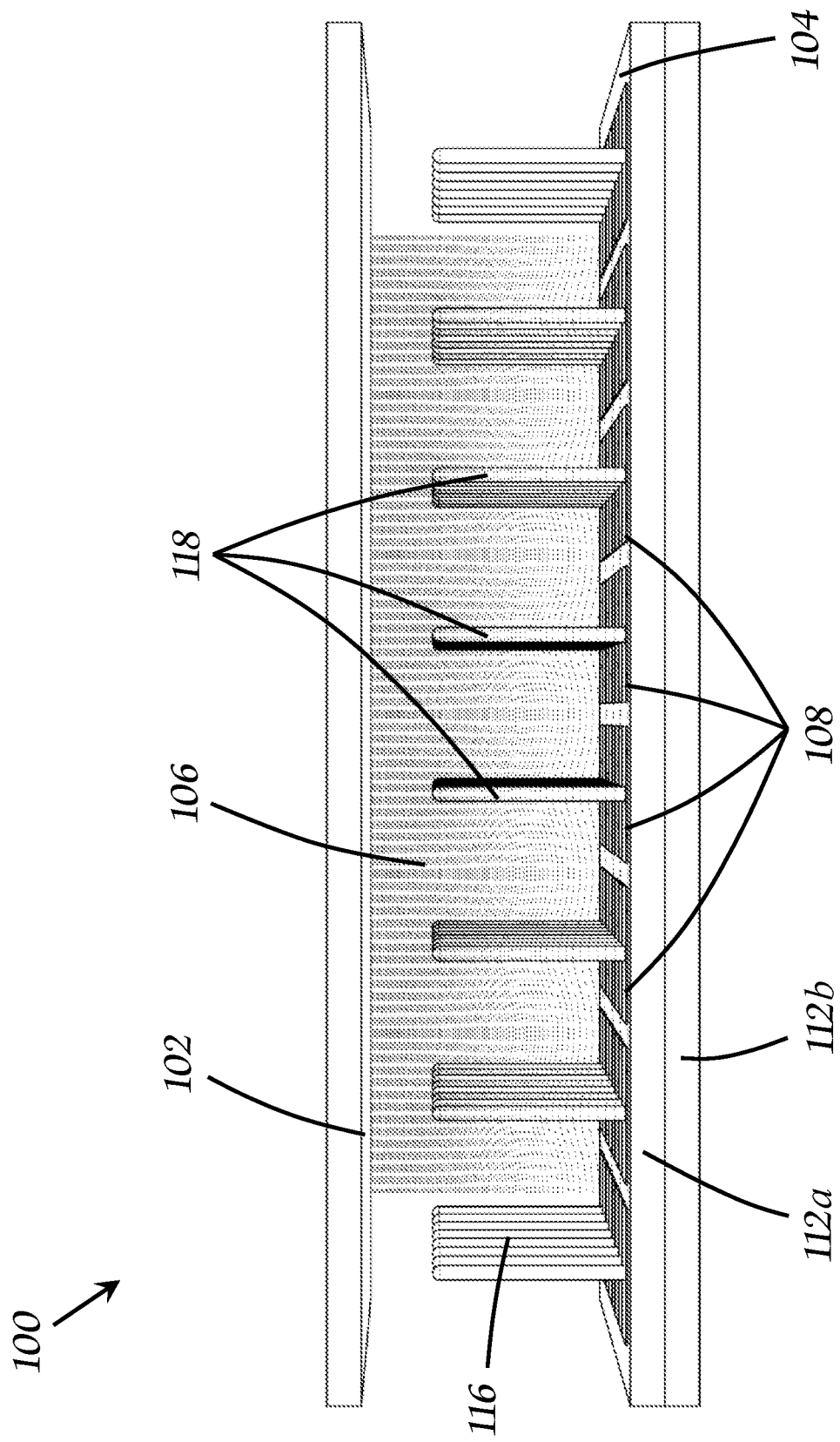
FIG. 21 is a perspective view of the particle beam detector array shown in FIG. 4 with voltage differential shown.
Figure 22:
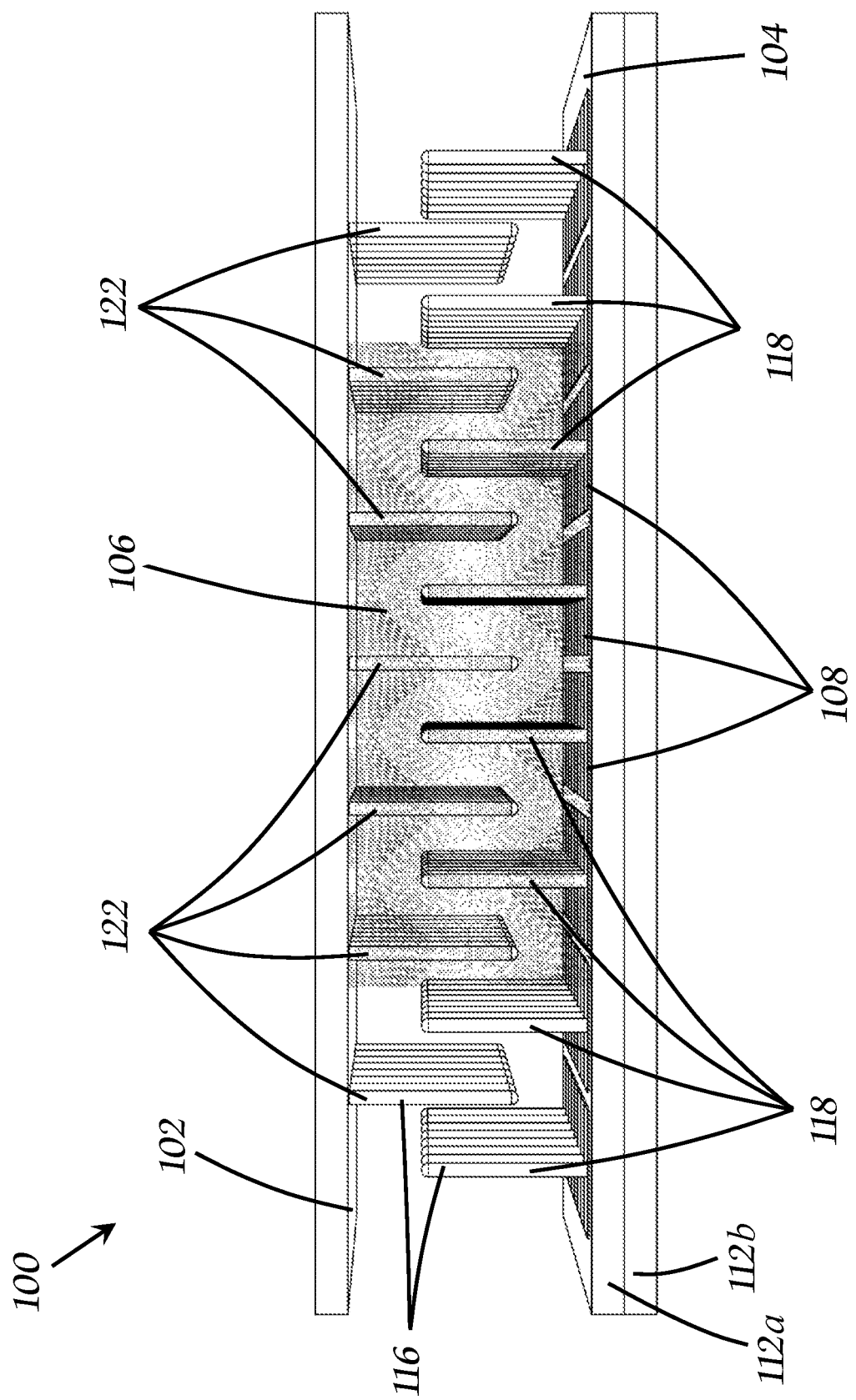
FIG. 22 is a perspective view of the particle beam detector array shown in FIG. 11 with electric field lines shown.
Figure 23:
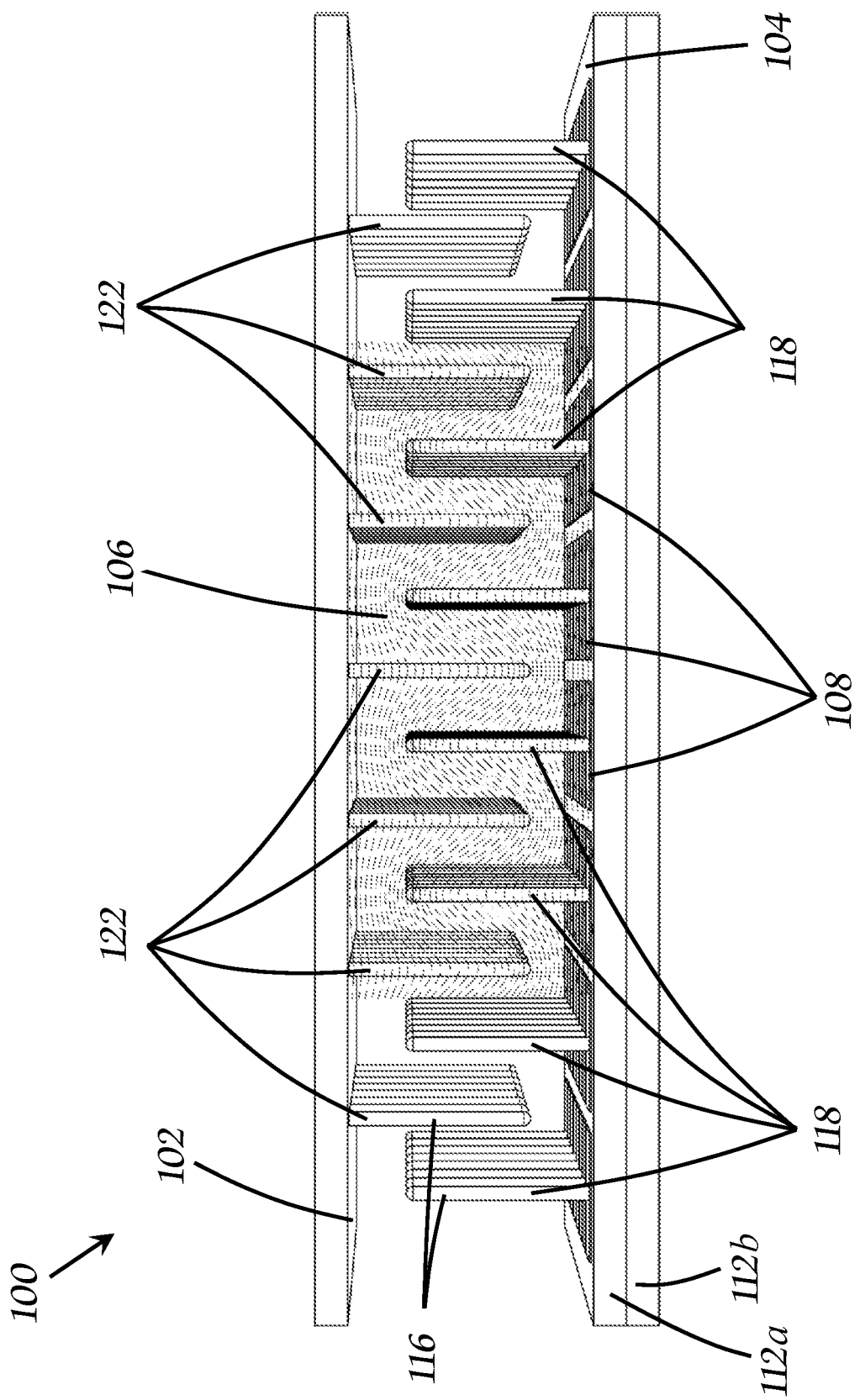
FIG. 23 is a perspective view of the particle beam detector array shown in FIG. 11 with voltage differential shown.

FIGS. 18-23 illustrate the various embodiments of the particle beam detector array 100 disclosed herein with the electric field lines shown in FIGS. 18, 20, and 22, and with the voltage differential shown in FIGS. 19, 21, and 23. Thus, FIGS. 18-23 further illustrate that the electric field strength increases as more pins 116 are added to the particle beam detector array 100. This increases the efficiency of the detector array 100 and decreases the electric potential difference required to obtain a readable signal from the detector array 100. Further, this increases the accuracy and precision of the particle beam detector array 100.

In some embodiments, multiple particle beam detector arrays 100 may be stacked on top of each other, creating a multi-plane arrangement of anodes 104. In such an embodiment, the detector array 100 may have a cathode 102 and a plurality of anodes 104, all parallel to and offset from each other. A potential difference may be applied between the cathode 102 and the first anode 104 of the plurality of anodes 104, and a potential difference may then be applied between each anode 104 and the next anode so that each anode 104 serves as a cathode for the next anode 104. For example, the cathode 102 may be at −800 V, a first anode 104 may be at −600 V, a second anode 104 may be at −400 V, a third anode 104 may be at −200 V, and a fourth anode 104 may be at 0 V. In this way, an ionizing particle beam 10 may pass through each layer of the detector array 100 and create electrons that are collected by each anode 104. This may increase the precision and accuracy of the measured signal. The first plurality of pins 118 and/or the second plurality of pins 122 may be implemented in such an embodiment on any or all of the layers of the particle beam detector array 100.

It will be understood that implementations of a particle beam detector array are not limited to the specific assemblies, devices and components disclosed in this document, as virtually any assemblies, devices and components consistent with the intended operation of a particle beam detector array may be used. Accordingly, for example, although particular particle beam detector arrays, and other assemblies, devices and components are disclosed, such may include any shape, size, style, type, model, version, class, measurement, concentration, material, weight, quantity, and/or the like consistent with the intended operation of particle beam detector arrays. Implementations are not limited to uses of any specific assemblies, devices and components; provided that the assemblies, devices and components selected are consistent with the intended operation of a particle beam detector array.

Accordingly, the components defining any particle beam detector array may be formed of any of many different types of materials or combinations thereof that can readily be formed into shaped objects provided that the materials selected are consistent with the intended operation of a particle beam detector array. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as gold, gold-plated copper, zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various particle beam detector arrays may be manufactured using conventional procedures as added to and improved upon through the procedures described here. Some components defining a particle beam detector array may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling particle beam detector arrays are not limited to the specific order of steps as disclosed in this document. Any steps or sequence of steps of the assembly of a particle beam detector array indicated herein are given as examples of possible steps or sequence of steps and not as limitations, since various assembly processes and sequences of steps may be used to assemble particle beam detector arrays.

The implementations of a particle beam detector array described are by way of example or explanation and not by way of limitation. Rather, any description relating to the foregoing is for the exemplary purposes of this disclosure, and implementations may also be used with similar results for a variety of other applications employing a particle beam detector array.

What is claimed is:

1. A particle beam detector array, comprising:
   a cathode plane offset from an anode plane and a sensitive region extending between the cathode plane and the anode plane with the sensitive region filled with a gas, wherein the cathode plane and the anode plane are configured to create an electric field within the sensitive region;

the anode plane comprising conductive sensor pads arranged in a repeating pattern and configured to conduct electric current based on a fluence and a position of an incident particle beam, wherein the sensor pads are coupled to a series of conductive strips with at least two layers, wherein the conductive strips within each layer are aligned with a different axis of at least two planar axes X and Y, and wherein the sensor pads form a plurality of interlocking detection clusters with each detection cluster coupled to the at least two planar axes X and Y;

a first plurality of conductive elongated pins extending away from the sensor pads into the sensitive region, wherein each pin of the first plurality of pins is electrically coupled to one of the conductive sensor pads; and a second plurality of conductive elongated pins electrically coupled to and extending away from the cathode plane into the sensitive region.

2. The particle beam detector array of claim 1, wherein a length of each pin of the first plurality of elongated pins is greater than half of a distance between the cathode plane and the anode plane and a length of each pin of the second plurality of elongated pins is greater than half of a distance between the cathode plane and the anode plane.

3. The particle beam detector array of claim 1, wherein the planar axis X is perpendicular to the planar axis Y.

4. The particle beam detector array of claim 1, wherein each pin of the first plurality of elongated pins protrudes less than or equal to 5 millimeters into the sensitive region.

5. The particle beam detector array of claim 1, wherein each sensor pad has a longest dimension of less than or equal to 5 millimeters.

6. A particle beam detector array, comprising:
a cathode plane offset from an anode plane and a sensitive region extending between the cathode plane and the anode plane with the sensitive region filled with a gas, wherein the cathode plane and the anode plane are configured to create an electric field within the sensitive region;

the anode plane comprising conductive sensor pads arranged in a repeating pattern and configured to conduct electric current based on a fluence and a position of an incident particle beam, wherein the sensor pads are coupled to a series of conductive strips with at least two layers, and wherein the conductive strips within each layer are aligned with a different axis of at least two planar axes X and Y; and a first plurality of conductive pins extending away from the sensor pads into the sensitive region, wherein each pin of the first plurality of pins is electrically coupled to one of the conductive sensor pads.

7. The particle beam detector array of claim 6, wherein a length of each pin of the first plurality of pins is greater than half of a distance between the cathode plane and the anode plane.

8. The particle beam detector array of claim 6, wherein the planar axis X is perpendicular to the planar axis Y.

9. The particle beam detector array of claim 6, wherein each pin of the first plurality of pins protrudes less than or equal to 5 millimeters into the sensitive region and wherein each sensor pad has a longest dimension of less than or equal to 5 millimeters.

10. The particle beam detector array of claim 6, wherein a distance between the cathode plane and the anode plane is less than or equal to 10 millimeters.

11. A particle beam detector array, comprising:
a cathode offset from an anode and a sensitive region extending between the cathode and the anode, wherein the cathode and the anode are configured to create an electric field within the sensitive region;

the anode comprising conductive sensor pads arranged in a repeating pattern and configured to conduct electric current based on a fluence and a position of an incident particle beam; and a first plurality of conductive pins extending away from the sensor pads into the sensitive region, wherein each pin of the first plurality of pins is electrically coupled to one of the conductive sensor pads.

12. The particle beam detector array of claim 11, further comprising a second plurality of conductive pins electrically coupled to and extending away from the cathode into the sensitive region.

13. The particle beam detector array of claim 12, wherein the first plurality of pins overlaps with the second plurality of pins in a direction parallel with the first plurality of pins.

14. The particle beam detector array of claim 11, wherein a length of each pin of the first plurality of pins is greater than half of a distance between the cathode and the anode.

15. The particle beam detector array of claim 11, wherein each pin of the first plurality of pins protrudes less than or equal to 5 millimeters into the sensitive region and each sensor pad has a longest dimension of less than or equal to 5 millimeters.

16. The particle beam detector array of claim 11, wherein a distance between the cathode and the anode is less than or equal to 10 millimeters.

17. The particle beam detector array of claim 11, wherein the sensor pads are coupled to a series of conductive strips with at least two layers and wherein the conductive strips within each layer are aligned with a different axis of at least two axes X and Y.

18. The particle beam detector array of claim 17, wherein the sensor pads form a plurality of interlocking detection clusters with each detection cluster coupled to the at least two axes X and Y.

19. The particle beam detector array of claim 18, wherein the series of conductive strips has three layers and the at least two axes X and Y is three axes X, Y, and ST (stereo).

20. The particle beam detector array of claim 19, wherein each interlocking detection cluster of the plurality of interlocking detection clusters comprises a diamond shape X sensor pad, a diamond shape Y sensor pad, and a diamond shape ST sensor pad joined to form the interlocking detection cluster comprising a hexagonal shape.

* * * * *